United States Patent
Maruta

[19]

[11] Patent Number: 5,868,576
[45] Date of Patent: Feb. 9, 1999

[54] LANGUAGE-INFORMATION PROVIDING APPARATUS

[75] Inventor: Tomoe Maruta, Kanagawa, Japan

[73] Assignee: Fuji Xerox Co., Ltd., Tokyo, Japan

[21] Appl. No.: 911,360

[22] Filed: Aug. 7, 1997

Related U.S. Application Data

[63] Continuation of Ser. No. 388,677, Feb. 14, 1995, abandoned.

[30] Foreign Application Priority Data

Feb. 15, 1994 [JP] Japan .................................. 6-040546

[51] Int. Cl.⁶ ............................ G09B 19/06; G09B 19/08
[52] U.S. Cl. .......................... 434/157; 434/118; 434/156;
434/185; 434/169; 704/4; 707/532; 706/927
[58] Field of Search .................................... 434/118, 156,
434/157, 169, 185, 307 R, 308, 323, 362,
365; 704/2–4, 9; 707/532, 541; 706/927

[56] References Cited

U.S. PATENT DOCUMENTS

| | | | |
|---|---|---|---|
| 4,443,856 | 4/1984 | Hashimoto et al. . | |
| 4,685,060 | 8/1987 | Yamano et al. | 434/157 X |
| 4,774,666 | 9/1988 | Miyao et al. | 434/157 X |
| 4,787,038 | 11/1988 | Doi et al. | 434/157 X |
| 4,791,587 | 12/1988 | Doi | 434/157 X |
| 4,980,829 | 12/1990 | Okajima et al. | 434/157 X |
| 5,029,084 | 7/1991 | Morohasi et al. | 364/419.05 |
| 5,091,876 | 2/1992 | Kumano et al. | 434/157 X |
| 5,442,546 | 8/1995 | Kaji et al. | 364/419.14 X |
| 5,523,943 | 6/1996 | Maruta et al. | 364/419.19 X |

FOREIGN PATENT DOCUMENTS

| | | |
|---|---|---|
| 0 327 408 | 8/1989 | European Pat. Off. . |
| 0 353 756 | 2/1990 | European Pat. Off. . |
| 55-103675 | 8/1980 | Japan . |
| 56-145461 | 11/1981 | Japan . |
| 57-23176 | 2/1982 | Japan . |
| WO 88/02516 | 4/1988 | WIPO . |

*Primary Examiner*—Joe H. Cheng
*Attorney, Agent, or Firm*—Finnegan, Henderson, Farabow, Garrett & Dunner, L.L.P.

[57] ABSTRACT

Several parts of speech, including sentences, words and phrases, in multiple languages, Japanese and English, for instance, are stored in a ROM; and some of the parts of speech include an addition-permitting flag indicating that a word or phrase can be added to these parts of speech. Words and phrases that may be added to the stored syntactical structures are also stored in the ROM. In response to user input, a desired syntactical structure is read from the ROM and displayed. When the displayed syntactical structure has an addition-permitting flag, a predetermined symbol near the displayed syntactical structure is displayed, and a desired word or phrase is read from the ROM and added to the displayed syntactical structure in response to a user input. Upon depression of a key, the resulting syntactical structure is translated into another language.

49 Claims, 24 Drawing Sheets

LANGUAGE-INFORMATION PROVIDING APPARATUS

This application is a continuation of application Ser. No. 08/388,677 filed Feb. 14, 1995, now abandoned.

FIELD OF THE INVENTION

The present invention relates to a language information providing apparatus which is capable of displaying words and phrases or sentences in predetermined languages, such as Japanese and English, on a display unit, outputting them as, for example, a voice output, and translating them into a language different from the outputted language. More particularly, the present invention concerns an invention in which a predetermined word or phrase, such as a date or time, can be added to examples of sentences or words and phrases prepared in advance.

DESCRIPTION OF THE RELATED ART

Conventional language-information apparatuses, such as electronic translating machines, store information concerning various sentences, words or phrases in a plurality of languages, such as Japanese and English, in a memory and can display a desired sentence, word or phrase by the operating a selection key by a user or by outputting the same by voice, and translating the outputted sentence, word or phrase into that in a different language.

In this type of language-information providing apparatus, in order to display sentences, words or phrases, output them as voice, and translate them into another language, it is necessary to register in advance illustrative sentences, words and phrases into a memory with respect to each of a plurality of languages. In this case, in a case where all the examples of similar sentences, e.g., "choshoku wa itsu toremasuka? (When can I have breakfast?)"

"yuhoku wa itsu toremasuka? (When can I have dinner?)"

"chushoku wa itsu toremasuka? (When can I have lunch?)" are registered in a memory, the amount of information to be registered in the memory becomes very large.

Therefore, Japanese Patent Application Laid-Open Nos. 55-103675, 56-145461, and 57-23176 provide electronic translating machines in which sentences, including partly changeable portions, and words and phrases which are substitutable in the changeable portions are stored in a memory, thereby reducing the capacity of the memory.

For instance, Japanese Patent Application Laid-Open No. 55-103675 discloses an invention in which a replaceable portion is displayed in blank form in parentheses, as shown in display examples (1) to (4) below, and if a general term is entered between the parentheses, all the allowable words and phrases stored under the general term are displayed, so that the user can select a desired word or phrase from the allowable words and phrases.

(1) ( ) wa itsu toremasuka?
(2) (shokuji) wa itsu toremasuka?
(3) (choushoku, chushoku, yushoku) wa itsu toremasuka?
(4) yushoku wa itsu toremasuka?
((4) is an example when "yushoku (dinner)" is selected by the user.)

Also, Japanese patent Application Laid-Open No. 56-145461 discloses a method in which a word or phrase is keyed into the changeable portion. In this case, however, since the translation is possible only when the information on the words and phrases keyed into the memory is stored, the publication explains that marks are provided to indicate whether the keyed-in words or phrases are registered in the memory, thereby making it possible to attract the attention of the user.

Further, Japanese Patent Application Laid-Open No. 57-23176 shows a method of voice output in a case where a word or phrase to be substituted in a changeable portion, as described above, is inputted.

For the electronic translating machines described above, since a changeable portion is set in advance in a sentence, the state of that changeable portion is unknown, so that the resulting sentence may fail to function as a proper and idiomatic sentence. Hence, in order to form a meaningful sentence, a user's selecting operation is required.

Additional difficulties arise when the changeable portion is information on a date or time. When the changeable portion itself is unnecessary for the user, such as in the case of the electronic translators described above, it is difficult to output a sentence by removing the changeable portion.

Although, in the case of information on a date, including the year, month, and day, or the day or time, individual information (numerical-value information) which should be a candidate subject to selection is finite, its combination is enormously large. For example, in the case of the date, it is necessary to prepare not only all the combinations of the year, month, and day, but also combinations of only the year and month and combinations of the month and day. In the case of the electronic translators described above, it is necessary to register all of these combinations in the memory in advance, so that a very large-capacity memory is required.

SUMMARY OF THE INVENTION

In view of the above-described circumstances, it is an object of the present invention to provide a language information providing apparatus in which illustrative sentences or the like which are to be stored in a memory need not be set in a sentence style which includes a changeable portion, and which make it possible to reduce information on, for example, the date or the day and time, which are prepared as substituting portions, to a necessary minimum.

To attain the above object, according to a first aspect of the invention, a language-information providing apparatus for outputting a sentence, words or phrases in a predetermined language, comprises:

storing means for storing information of addition-permitting sentences, words and phrases to which a sentence, word or phrase can be added;

output means for outputting a particular one of the addition-permitting sentences, words and phrases stored in said storing means;

signaling means for signaling that a sentence, word or phrase can be added to the particular addition-permitting sentence, word or phrase;

input means for inputting an addition sentence, word or phrase; and added-sentence, words or phrases output means for outputting the particular sentence, word or phrase added with the addition sentence, word or phrase inputted by the input means.

According to a second aspect of the invention, a language-information providing apparatus for outputting a sentence, words or phrases in a predetermined language, comprises:

storing, means for storing Information of sentences, words and phrases;

output means for outputting a particular one of the sentences, word and phrase stored in said storing means;

input means for inputting day/time information; and day/time-adding output means for outputting the particular sentence, word or phrase added with a day and a time of the day/time information inputted by said input means.

According to a third aspect of the invention, a language-information providing apparatus for outputting a sentence, words or phrases in a predetermined language, said apparatus comprising:

storing means for storing information of sentences, words and phrases;

output means for outputting a particular one of the sentences, word and phrase stored in said storing means;

input means for inputting a word or phrase for modifying the particular sentence, word or phrase; and modifying-word or phrase-adding output means for outputting the particular sentence, word of phrase modified by the word or phrase inputted by said input means.

According to a fourth aspect of the invention, a language-information providing apparatus for translating and outputting EL sentence, words or phrases in a predetermined language, comprises:

output means for outputting a noun or a noun clause based on information of sentences, words and phrases in a first language;

modifying-word or phrase adding means for adding a modifying word or phrase to the noun or noun clause, to produce an added sentence in the first language;

added-sentence output means for outputting the added sentence in the first language;

translation-instructing means for instructing the apparatus to translate the added sentence in the first language; and translating means for translating the added sentence in the first language into a sentence in a second language.

According to a fifth aspect of the invention, a language-information providing apparatus for outputting a sentence, words or phrases in one of a plurality of languages, comprises:

input means for inputting an addition sentence, word or phrase; and output means for adding the addition sentence, word, or phrase to a subject sentence, word or phrase while determining, depending on a language concerned, a position in or with respect to the subject sentence, word or phrase at which position the addition sentence, word or phrase is added, and outputting a resulting sentence, words or phrases.

According to a sixth aspect of the invention, a language-information providing apparatus comprises:

first storing means for storing a plurality of sentence data, each of the sentence data including addition possibility data indicating whether a word or phrase can be added to a sentence of the sentence data;

second storing means for storing words and phrases that may be added to sentences of the plurality of sentence data stored in the first storing means;

first selecting means for selecting a particular one from the sentence data stored in said first storing means;

second selecting means for selecting a particular one from the words and phrases stored in said second storing means;

display means for displaying the particular sentence data and the particular word or phrase selected by said first and second selecting means; and sentence input means for allowing selection by said second selecting means when the addition possibility data of the particular sentence data indicates that a word or phrase can be added to a sentence of the particular sentence data.

According to a seventh aspect of the invention, a translating apparatus for translating a sentence in a first language into a sentence in a second language, comprises:

first storing means for storing a plurality of sentence data in the first language, each of the sentence data including addition possibility data indicating whether a word or phrase can be added to a sentence of the sentence data;

second storing means for storing words and phrases that may be added to sentences of the plurality of sentence data stored in said first storing means;

first selecting means for selecting a particular one from the sentence data stored in said first storing means;

second selecting means for selecting a particular one from the words and phrases stored in said second storing means;

display means for displaying the particular sentence data and the particular word or phrase selected by said first and second selecting means;

first-language-sentence input means for allowing selection by said second selecting means when the addition possibility data of the particular sentence data indicates that a word or phrase can be added to a sentence of the particular sentence data; and translating means for translating the particular sentence in the first language added with the particular word or phrase into a sentence in the second language.

The word or phrase to be added to respective sentences is at least one element of the year, month, day, and time, or a request sentence such as "onegai shimasu (please)" or "please," or an object of a sentence, or the like, and refers to that which makes a meaning together with a sentence by being added to the sentence.

In the first aspect of the invention, sentences, words, and phrases to which sentences, words, or phrases can be added are stored in the storing means, and the independent sentence read out from the storing means constitutes a complete sentence. When the sentence read out from the storing means is such that a sentence, word, or phrase can be added thereto, the signaling means informs the user of the fact that the addition of the sentence, word, or phrase is possible. Accordingly, through this signaling, the user comes to know that the sentence, word, or phrase can be added to that sentence, so that the user is capable of entering a sentence, word, or phrase to be added by means of the input means. The sentence, word, or phrase with the sentence, word, or phrase added thereto is outputted by the output means.

In the second aspect of the invention, day/time information is inputted as a word or phrase to be added, and is added to a sentence read out from the storing means. Unlike operation for replacement, the day/time information is inputted and added to a sentence, and it is possible to form additional information by combining the year, month, day, and time at the time of inputting. Hence, it suffices if individual numerical-value information on such as the year, month, day, and time are stored in advance in the memory. Therefore, it is not necessary to prepare all the replacement data including the combinations of the year, month, day, and time.

In the third aspect of the invention, a word or phrase for modifying a sentence, word, or phrase, e.g., an adverb, such as "soon," "for a while," and "yet," is entered by the input means, is outputted by being added to the sentence, word, or phrase read out from the storing means by means of the modifying-word or phrase-adding output means. For example, as an adverb "suguni (soon)" is added to a complete sentence "kaeshimasu (I return it)" (in the case of English, "I return it"), a separate sentence "suguni, kaeshimasu (I return it soon)" (in the case of English, "I return it soon.") is formed.

In the fourth aspect of the invention, a word or phrase modifying a noun or a noun clause, such as a requesting phrase "o onegai shimasu (in English, ", please")" is added to the noun or the noun clause, thereby making it possible to easily form a request sentence. Then, the sentence can be outputted after being translated from the first language, e.g., Japanese, into the second language, e.g., English.

In the fifth aspect of the invention, the output means determines a position where a sentence, word, or phrase inputted for addition is to be added, depending on the type of language. For instance, when day/time information is to be added, the day/time information is added in front of the sentence in the case of Japanese. For example, in a case where the day/time information "5 (itsu)ka (on the 5th)" is added to "koko ni kite kudasai (Please come here),"

the sentence becomes "5 (itsu)ka ni koko ni kite kudasai (Please come here on the 5th)." On the other hand, in the case of English in this example, the day/time information is added after the sentence, so that if the day/time information "on the 5th" is added to "Please come here."

the sentence becomes "Please come here on the 5th."

BRIEF DESCRIPTION OF THE DRAWINGS

FIG. 4 is a diagram illustrating the contents of the memory in accordance with the embodiment of the language-information providing apparatus of the present invention;

FIGS. 5A and 5B illustrate examples of displays in accordance with the embodiment of the language-information providing apparatus of the present invention;

DESCRIPTION OF THE PREFERRED EMBODIMENTS

Figure 1:
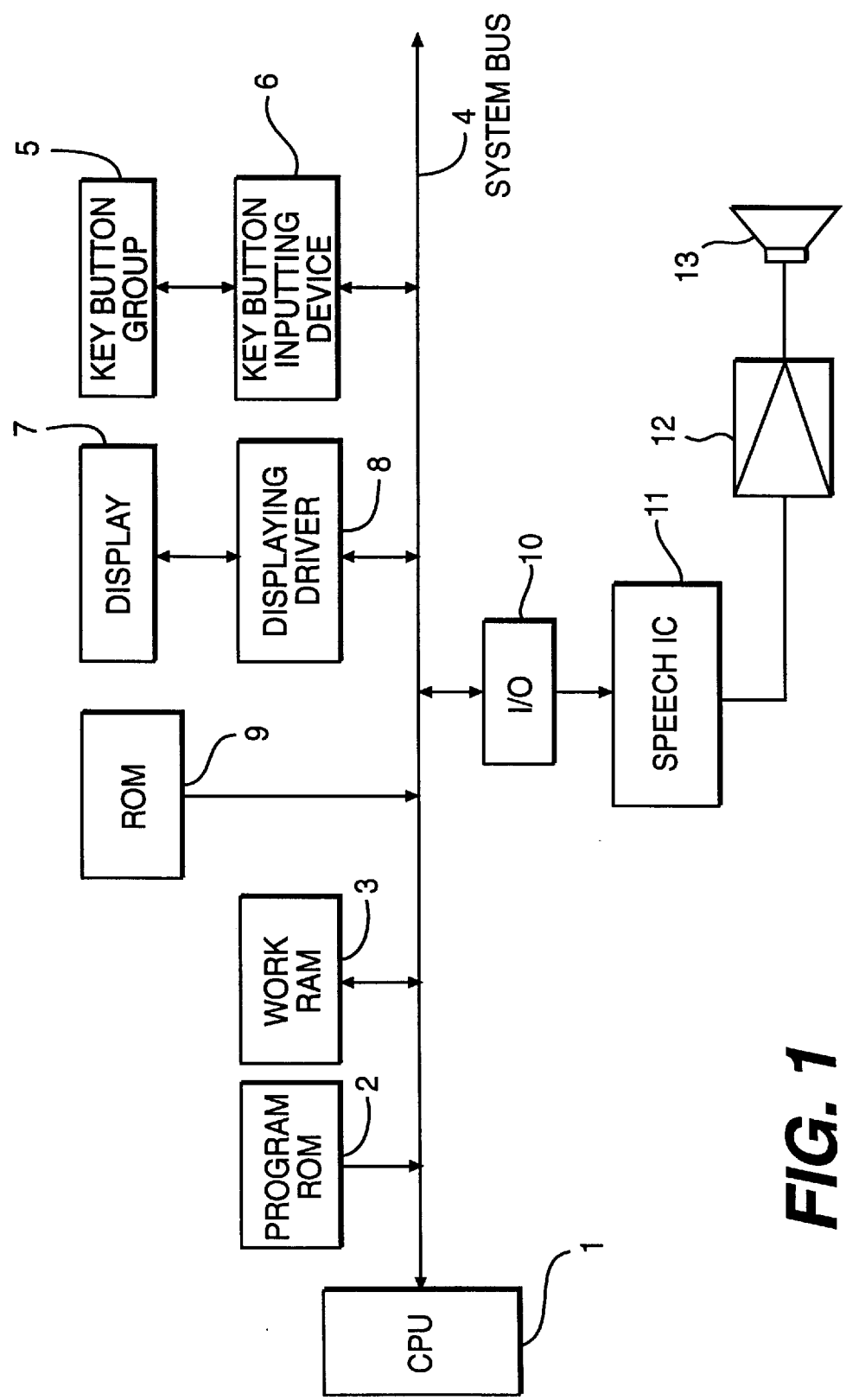
FIG. 1 is a block diagram of an embodiment of a language-information providing apparatus in accordance with the present invention.

Referring now to the drawings, a description will be given of an embodiment of a language-information providing apparatus in accordance with the present invention. In the embodiment which is described below, an example is given in which Japanese is used as a first language, and English is used as a second language, and both languages are mutually translatable from one into the other.

The language-information providing apparatus of this example is basically realized by software using a microcomputer, and FIG. 1 is a diagram illustrating a configuration of its hardware. In addition, FIG. 2 is a diagram illustrating an operation panel surface of this language-information providing apparatus.

In FIG. 1, reference numeral 1 denotes a CPU for effecting the overall control of the language-information providing apparatus of this example. Numeral 2 denotes a program ROM in which a program for performing various processing which will be described later is stored. Numeral 3 denotes a RAM for a work area used as an area for temporarily storing necessary data. The program ROM 2 and the work RAM 3 are connected to the CPU via a system bus 4.

Figure 2:
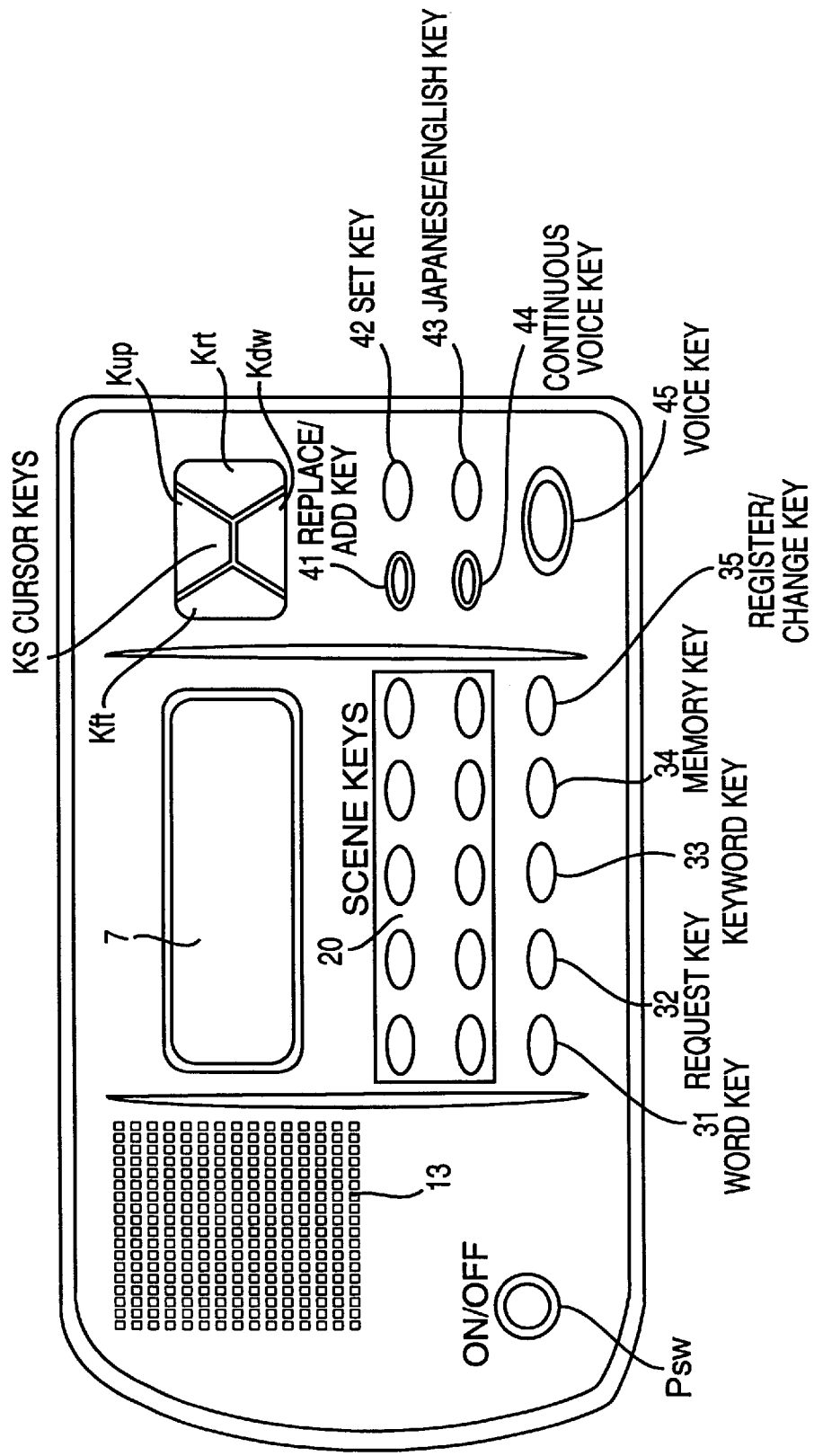
FIG. 2 is a diagram illustrating an example of an operation panel in accordance with the embodiment of the language-information providing apparatus of the present invention.

As shown in FIG. 2, the language-information providing apparatus of this example has a key button group consisting of a plurality of keys. This key button group 5 is connected to the system bus 4 via a key-button input device 6 which plays the role of an interface with the microcomputer.

In addition, the language-information providing apparatus of this example has a display 7, consisting of an LCD (liquid-crystal display), for displaying sentences, words and phrases. The display 7 is connected to the system bus 4 via a displaying driver 8, which is an interface.

ROM 9 (FIG. 3) registers sentences, words and phrases as display information and voice information in Japanese and English. Specifically, stored in advance in ROM 9 are (1) display data on providable sentences, words and phrases in Japanese and English as well as data for outputting them as voice (2) display data on such matters as the day and time to be added in Japanese and English, as well as data for outputting them as voice; display data on modifying words and phrases, such as adverbs and requesting words and phrases, in Japanese and English, and data for outputting them as voice. The data in the ROM 9 is read by the CPU 1 through the system bus 4.

In this example display data and voice data on sentences, words and phrases that are required in various scenes are classified for each scene and registered in the ROM 9. Included in the various scenes are, for instance, communication scenes for daily conversation, customs scenes for obtaining conversations and necessary words and phrases for the customs when traveling, postal/telephone scenes at a post office or when making or answering a phone call, emergency scenes corresponding to necessary sentences or the like when an emergency situation has occurred, meal scenes, and so on.

When a voice key, which will be described later, is pressed, the data for outputting voice is read from the ROM 9, supplied to a speech IC Il via an I/O port 10 to be decoded, and is then supplied to a speaker 13 via an amplifier 12 so a voice output of the sentence, word or phrase being displayed on the display 7 is provided from the speaker 13.

As shown in FIG. 2, in addition to a power button Psw and cursor keys KS including an up key Kup, a down key Kdw, a left key Kft, and a right key Krt, the following keys are provided as the key button group 5 in this example.

Each key in scene key group 20 corresponds to a different one of the various scenes stored in the ROM 9. If one of the scene keys in the scene key group is pressed, the sentences, words and phrases set for that key are read from the ROM 9.

For this reason, the ROM 9 has its memory area divided for each scene, and sentences, words and phrases that are considered to be necessary for the respective scenes are registered in those areas.

Figure 3:
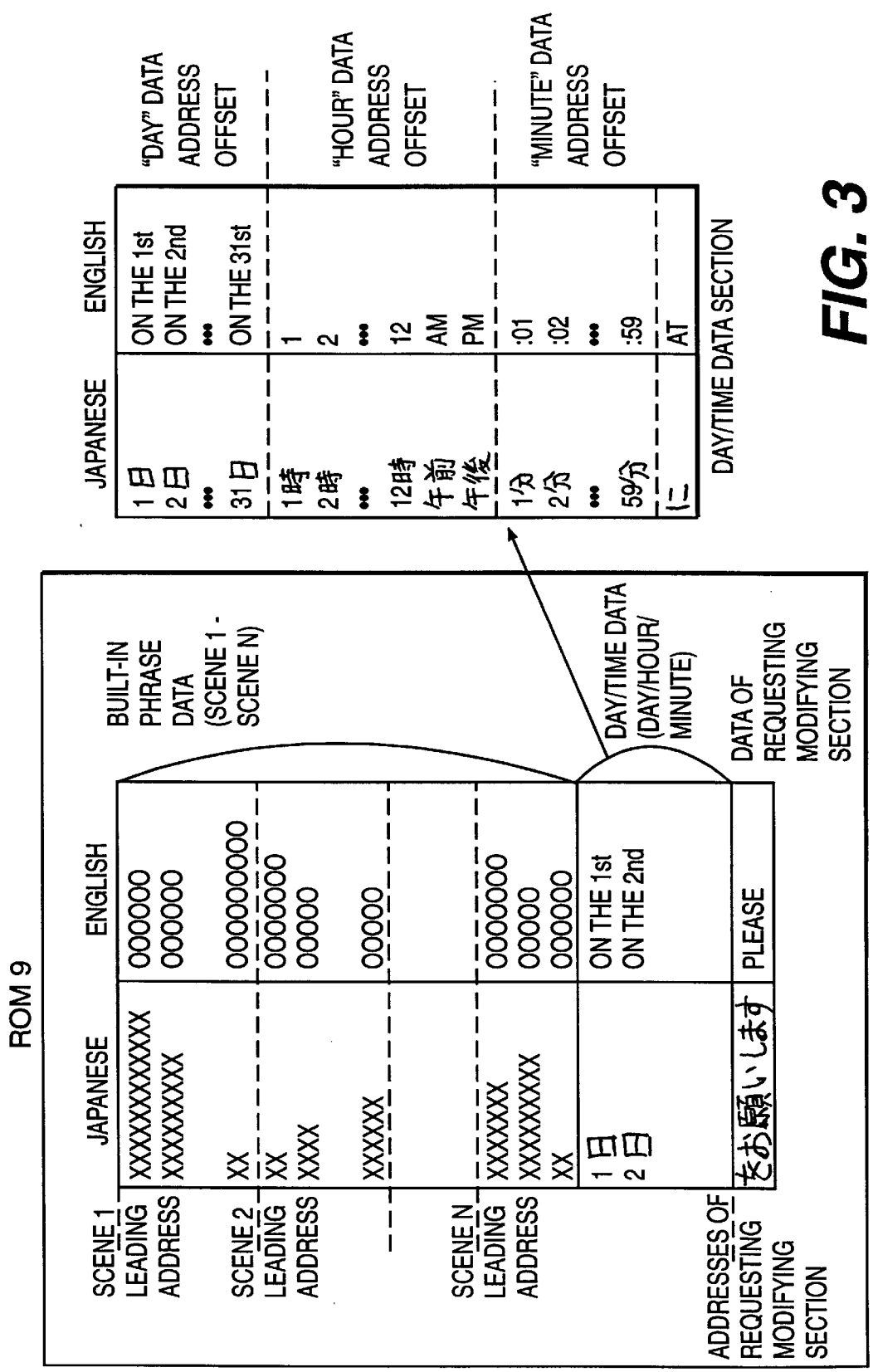
FIG. 3 is a diagram illustrating the contents of a memory in accordance with the embodiment of the language-information providing apparatus of the present invention.

FIG. 3 shows part of the contents stored in the ROM 9. As shown in FIG. 3, a memory area is classified and set for each scene, and when one scene key is pressed, a word, phrase or sentence at a leading address in the memory area of the scene is read from the ROM 9, and displayed on the display 7.

Then, after the scene key is pressed, if the up key Kup or the down key Kdw among the cursor keys KS is operated, the address in the memory area of each scene is changed, and the sentences, words and phrases that are stored as information for the corresponding scene in the ROM 9 are consecutively scrolled and displayed on the screen of the display 7.

In this case, the sentences, words and phrases for the respective scenes, those in Japanese and corresponding ones in English, are stored in the ROM 9, and voice information corresponding to each of them, though not shown in FIG. 3, is also stored therein.

In addition, as shown in FIG. 2, in the apparatus of this example, a word key 31, a request key 32, a keyword key 33, a memory key 34, and a register/change key 35 are provided below the scene keys 20.

The word key 31 is used when searching a word by using the first letter of the word in the hiragana syllabary as a keyword of that word when the language is, for instance, Japanese, or by using the first letter of the word in the alphabet in the case of English.

The request key 32 is pressed when a request sentence is formed by adding a requesting modifying phrase such as ". . . o onegai shimasu (please)" to a predetermined word, as will be described later. To form this request sentence, a requesting modifying phrase "o onegai shimasu (please)" is registered in the ROM 9, while a corresponding word "Please" is stored in a corresponding English storage area, as shown in FIG. 3.

The keyword key 33 is a key for retrieving a word or phrase or a sentence by using a predetermined keyword as a key. The memory key 34 and the register/change key 35 are used when the sentences, words and phrases registered in the memory area of each scene in the ROM 9 are registered in a separate memory area so that they can be fetched quickly.

Furthermore, in this example, a replace/add key 41, a set key 42, a Japanese/English key 43, a continuous voice key 44, and a voice key 45 are provided below the cursor keys KS, as shown in FIG. 2. If the replace/add key 41 is pressed, it is possible to replace a predetermined replaceable portion in the same way as the conventional apparatus, and in the case of sentences to which day and time data can be added, it is possible to selectively set and input additional information.

The set key is a key for confirming the result of replacement or addition. The Japanese/English key 43 is a key for displaying either Japanese or English on the display 7, and for determining whether to provide a voice output from the speaker 13. Each time this key is pressed, one language is changed to the other. The voice key 45 is a key which, when pressed, makes the sentence, word or phrase being displayed on the display 7 audible from the speaker 13 as a voice output of the language being displayed at that time. The continuous voice key 44 is pressed for practice, and causes the sentence, word or phrase being displayed on the screen of the display 7 to be repeatedly outputted in the form of voice.

In this example, sentences, words and phrases to which day/time information and other words, phrases, and sentences can be added, and sentences to which such day/time information or the like need not be added are stored in the ROM 9 in a distinguishable state.

FIG. 4 is a diagram illustrating examples of sentences, words and phrases for which addition is possible, sentences for which addition is impossible, and words and phrases for which addition is impossible, as well as a representation of this state of storage in the ROM 9. Particular identification data, i.e., a "$" mark in FIG. 4, is attached to the beginning of the data on sentences, words and phrases to which day/time information and the like can be added. In the case of sentences for which the addition of the day/time information is unnecessary or impossible, this "$" mark is not attached to the beginning of the data.

When the sentence, word or phrase that permits addition, and thus has the "$" mark provided at its beginning (such a sentence, word or phrase will be hereafter referred to as the "phrase") is read from the ROM 9 and displayed on the display 7, a predetermined display mark, such as the one shown in FIG. 5A, is displayed at the beginning of the phrase for the user's convenience. In the example shown in FIG. 5A, a clock mark M is displayed as a symbol indicating that the phrase is one which permits addition. In a case where the sentence does not permit addition, as shown in FIG. 5B, the mark M is not displayed on the display 7.

This clock mare M as a symbol, though not shown in FIG. 3, is stored in the ROM 9 as image data or character data. Then, when the "$" mark is at the beginning of the phrase data, control is provided to display the phrase data by adding the clock mark M.

By viewing the clock mark on the display, the user is capable of simply confirming whether the phrase is one which permits the addition of the day/time information. When the user wishes to add the day/time information to the phrase which permits the addition of the day/time information, as will be described later, the day/time information can be added by operating the replace/add key 41.

As is also apparent from FIG. 4, the phrases that permit the addition of the day/time information, when used independently, serve the purpose of sentences. Accordingly, these phrases can, of course, be used without adding the day/time information thereto. In this respect, the scope of usage can be expanded as compared with cases where substituting sentences must be entered unfailingly as in the above-described conventional example in which a replaceable portion is made blank and a word or phrase is entered in the blank portion.

In this example, the day/time information to be added is stored in the ROM 9. In the case of the conventional replacing system, all the combinations of the year, month, day, hour, and minute, must be prepared for replacement as the data for adding such day/time information, so that a huge memory capacity is required. In this example, however, only the data necessary for each item of the year, month, day, hour, and minute is stored, and the data is appropriately selected by the user, thereby reducing the necessary capacity of the memory. Those that are extracted on the right-hand side of FIG. 3 are data portions of the "day," "hour," and "minute" in the day/time data in the ROM 9.

As is apparent from FIG. 3, the data on the "day," "hour," and "minute" is stored in the ROM 9 by being classified into a day data area, an hour data area, and a minute data area. "1 nichi (on the "1st)" to "31 nichi (on the 31st)" as Japanese data on day data, and "on the 1st" to "on the 31st" as English data corresponding thereto, are prepared and stored in the day data area.

Also, "1 ji (o'clock)" to "12 ji (o'clock)" and "gozen (a.m.)" and "gogo (pm.)" are prepared as Japanese data on time data, while numerical values "1" to "12" and "a.m." and "p.m." are prepared and stored in the time data area as corresponding English data.

Further, "1 pun (minute)" to "59 hun (minutes)" are prepared as Japanese data on minute data, while combinations of ":" and numerals, i.e., ":01" to ":59," are prepared as corresponding English data. Finally, "ni (at)" is prepared as Japanese data on the word for adding day/time information, while "at" is prepared as corresponding English data, and they are stored in the ROM 9. That is, it suffices to prepare and store only numerical values necessary for the day, hour, and minute and prepositions, so that the memory capacity can be small.

As the method of adding the day/time information to the phrase which permits addition, in the case of Japanese, the day/time information can be added if the day/time information is arranged consecutively at the beginning of the sentence permitting addition, and if the preposition "ni (at)" is inserted at the end. In the case of English, on the other hand, the day/time information can be added if "at" is first added to the end of the phrase permitting addition, the time and minute data are arranged after that, and the day data is added to the very end.

Figure 6:
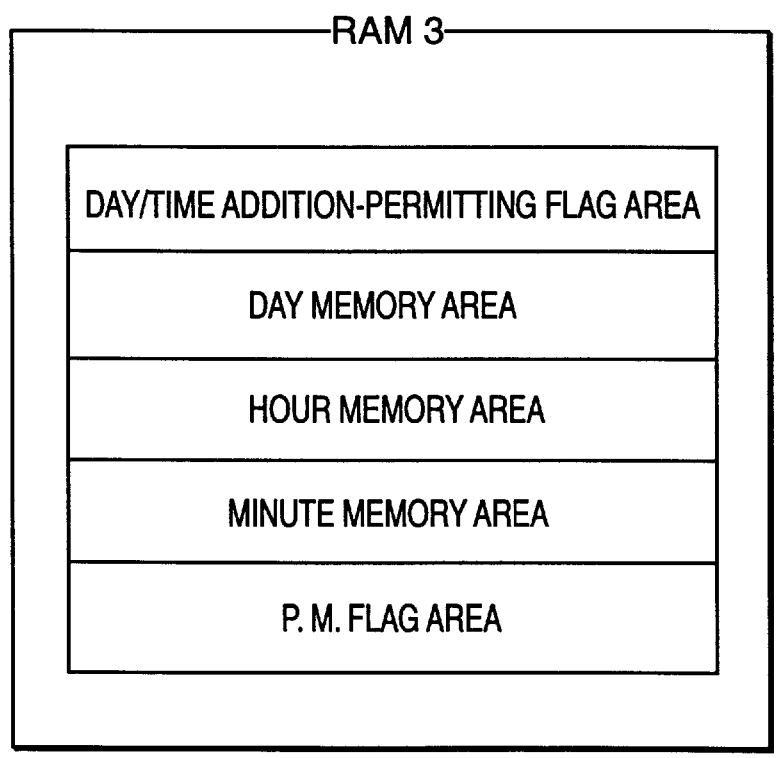
FIG. 6 is a diagram illustrating the contents of a work memory in accordance with the embodiment of the language-information providing apparatus of the present invention.

The day/time information to be added is determined by the user by means of the cursor keys KS and the set key 42, as will be described later. The data on settings of the day, hour, and minute determined by the user are stored in a day memory area, an hour memory area, and a minute memory area of the RAM 3 for a work area, as shown in FIG. 6. At this time, the flag indicating that the day and time can be added as well as a p.m. flag indicating whether the setting of the time is a.m. or p.m. are simultaneously stored in the relevant memory area.

As also described before, in the same way as the conventional example, the apparatus of this example is capable of forming a similar sentence by replacing a predetermined word or phrase in the sentence, but since the portion of the replacing technique is not an essential portion of the present invention, a description thereof will be omitted. The present invention has a characteristic feature in that a predetermined sentence, word or phrase can be added to a phrase registered in advance.

Figure 7:
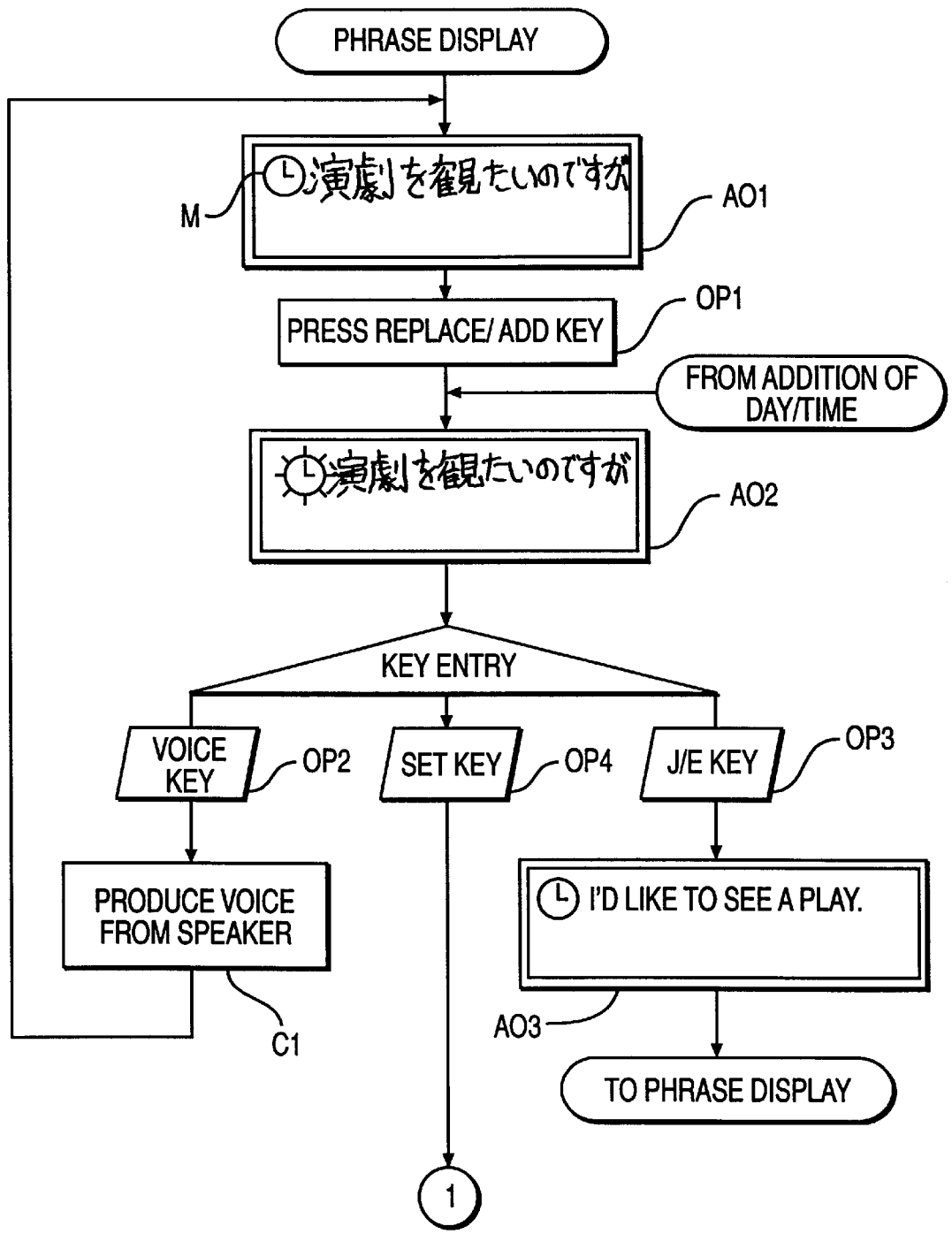
FIG. 7 is a diagram illustrating a flowchart of the operation in accordance with the embodiment of the language-information providing apparatus of the present invention.
Figure 8:
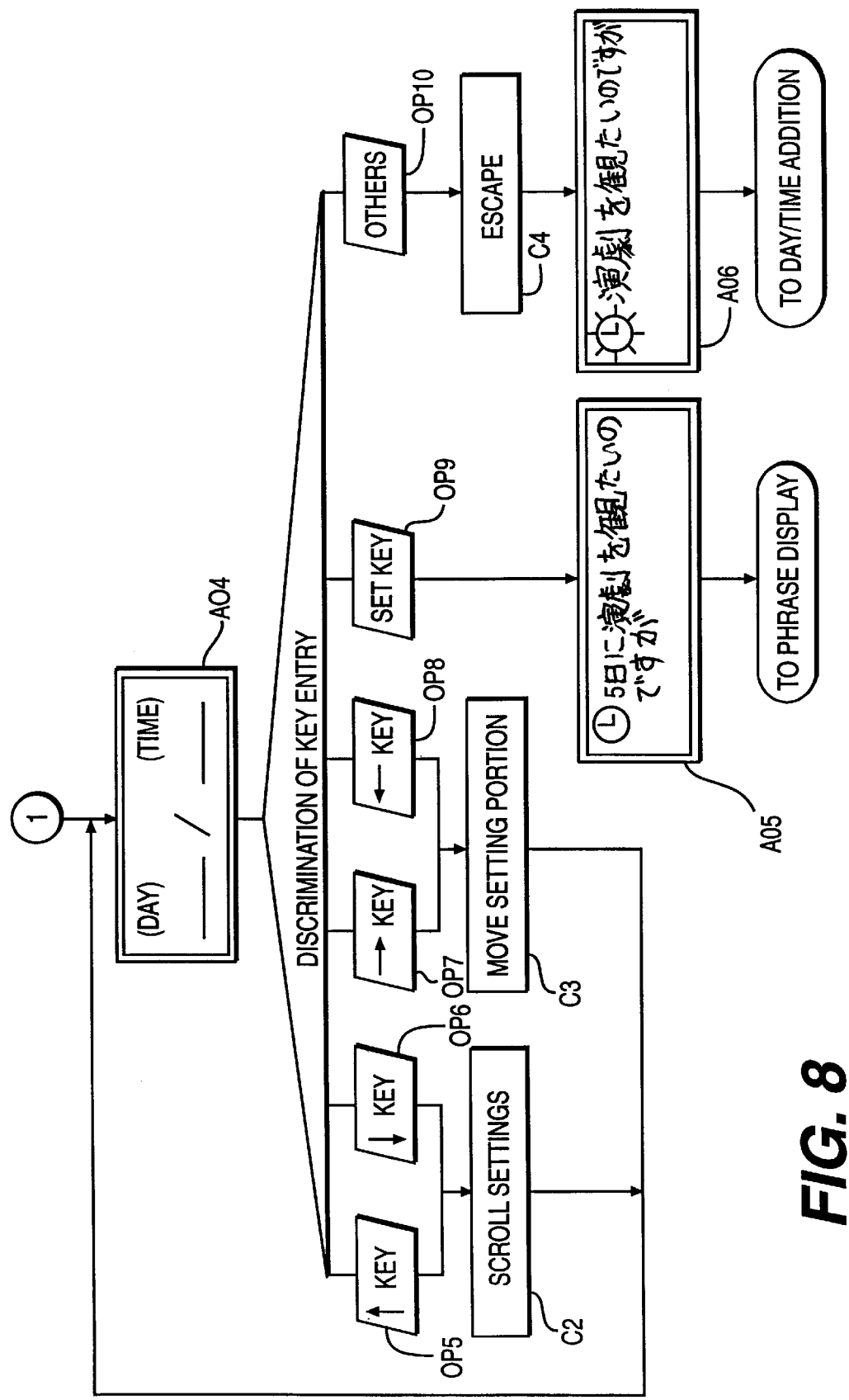
FIG. 8 is a diagram illustrating a flowchart of the operation in accordance with the embodiment of the language-information providing apparatus of the present invention.

FIGS. 7 and 8 are flowcharts for an operation referred to as phrase display in which the operation of adding day/time information to a predetermined phrase is illustrated by centering on a display on the display 7 and the user's operation. This example is one in which the day and the time including hour and minute are added as the day/time information. Incidentally, in FIGS. 7 and 8, portions surrounded by a double frame indicate the state of display of the screen of the display 7.

In FIG. 7, a phrase of the scene corresponding to the pressing of a predetermined key of the scene keys 20 displayed on the screen of the display 7. In this example, a phrase "engeki o mitai no desuga (I'd like to see a play)" is displayed as a phrase permitting the addition of the day and time, and the clock mark M indicating that the day and time can be added is displayed in front of that phrase (screen A01).

If the user presses the replace/add key 41 (operation OP1), the clock mark M on the screen of the display 7 flashes as shown in a screen A02.

If the voice key 45 is pressed in this state (operation OP2), the voice of the phrase being presently displayed is produced from the speaker 13 (control operation Cl), and the operation subsequently returns to the state of the screen A01. Meanwhile, if the Japanese/English key 43 is pressed in the state of the screen A02 (operation OP3), the screen changes to the screen A03 of an English translation of the Japanese phrase presently displayed, and then the operation returns to the beginning of the flow of the display of the phrase.

Then, if the user presses the set key in the state of the screen A02 (operation OP4), the screen of the display 7 changes to a display screen A04 for setting the "day" and "time," as shown in FIG. 8. In this screen A04 for setting the day and time, the portion of an item for setting the "day" initially flashes, thereby assuming a state for selecting and setting the "day." If the up key Kup or the down key Kdw among the cursor keys KS is operated in this state (operation OP5 or OP6), the display values of the "day" undergo scrolling in which the display value changes within the range of 1 and 31 (control operation C2). Then, a numerical value selected by scrolling is numerically displayed below "<day>" on the screen A04.

If the right key Krt among the cursor keys KS is pressed in this state (operation OP7), the flashing portion changes to the portion of "time," and the setting portion moves (control operation C3).

After the setting portion has been changed to "time," if the up key or down key is operated again (operation OP5 or OP6), the setting of time consecutively undergoes scrolling in a state in which it includes the flag of a.m. or p.m. Then, a numerical value thus selected is numerically displayed on the display 7 below the portion of "<time>."

Incidentally, if the left key Kft is pressed in this state (operation OPS), the setting portion returns to the portion of "day," and the portion of "day" flashes. Here, if necessary, the setting of the portion of "day" can be changed by operating the up key Kup or the down key Kdw. The setting of "day" and "time" is carried out by operating the up key Kup, the down key Kdw, the left key Kft, and the right key Krt in the above-described manner.

After the setting of the "day" and "time" in the above-described manner, the set key 42 is pressed again (operation OP9). Then, the pressing of the set key 42 confirms the setting of the "day" and "time," and the confirmed "day" and "time" are added to the phrase permitting addition and are displayed.

At this time, the setting of only "day" or only "time" is possible. If only the "day" is to be set, it suffices if the numerical value of the "day" is determined, and the set key 42 is pressed without setting the time. Similarly, if only the "time" is to be set, it suffices if the right key Krt is pressed in the state of the screen A04 to assume to state of setting the time, and the setting is then made to undergo scrolling by the up key Kup or the down key Kdw to set the time, followed by the pressing of the set key 42.

In the case of Japanese, the result of the phrase after this addition processing is added to the beginning portion of the sentence permitting addition. Namely, a screen A05 shows that state, and the case of the illustrated example is a case in which only "day" is set. Subsequently, the operation returns to the beginning of the flow of phrase display.

Incidentally, if a key other than the cursor keys KS and the set key 42 is pressed in the screen for setting the "day" and "time" in the screen A04 (operation OP10), the operation exits from this screen for setting the "day" and "time," and returns to the original screen for phrase display, which is a screen A06 in the state in which the clock mark indicating that the day and time can be set flashes. Subsequently, the operation proceeds to a day/time adding routine which will be described later. Then, after completion of the day/time adding routine, the operation returns to the original screen, i.e., the screen A02.

Figure 9:
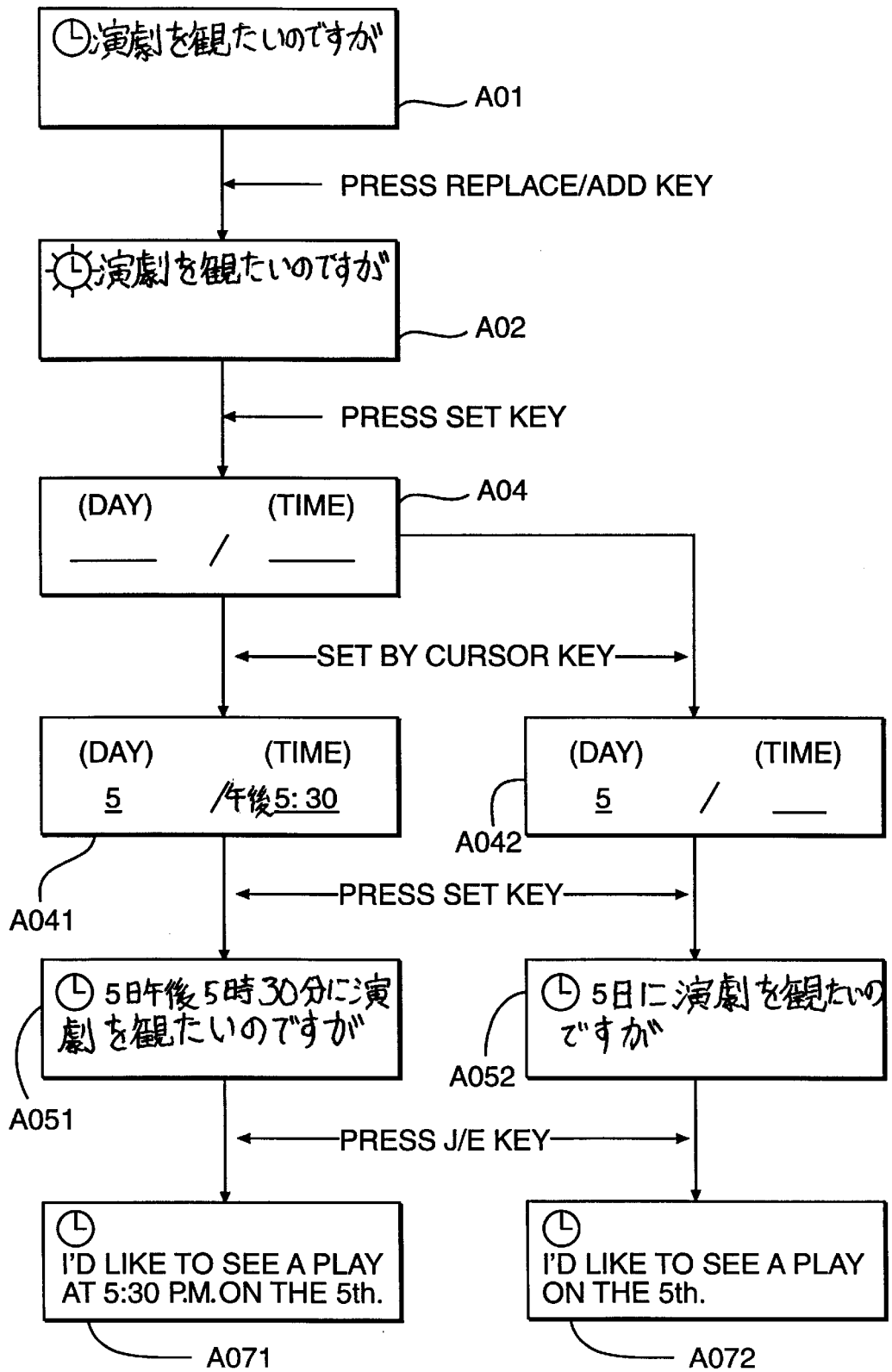
FIG. 9 is a diagram illustrating an example of change in a display screen in the operation in accordance with the embodiment of the language-information providing apparatus of the present invention.

FIG. 9 shows a diagram in which the above-described processing is carried out as the flow of the change of only the display screen of the display 7. Namely, first, when the phrase permitting the addition of the day and time is being displayed on the screen A01, if the replace/add key 41 is pressed, the clock mark M indicating that the day and time can be added starts to flash, as shown in the screen A02.

If the set key 42 is pressed in this state, the screen changes from the screen A02, in which the phrase and the addition-permitting mark are displayed, to the screen A04, for setting the "day" and "time" as additional information. Then, if information on both "day" and "time" is set in this setting screen A04, the screen changes to, for instance, a screen A041. If only the "day" is set, the screen changes to, for instance, a screen A042.

Then, if the set key 42 is pressed in the state shown in the screen A041 or A042, the screen changes to a screen A051 or A052 in which the phrase with information on the day or time added thereto is displayed.

If the Japanese/English key 44 is pressed in this state, the screen changes to a screen A071 or A072 in which the phrase translated into a corresponding English phrase is displayed. Further, if the voice key 45 is pressed, the phrase is produced as voice from the speaker 13 in the language being presently displayed on the display 7. That is, the voice information on the phrase in the language read out from the ROM 9 is decoded by the speech IC 11, into a speech signal, which is then supplied to the speaker 13 via the amplifier 12 and reproduced from the speaker 13.

Next, a description will be given of the processing operation by the CPU 1 for the operation of adding the day and time to the addition-permitting phrase.

Figure 10:
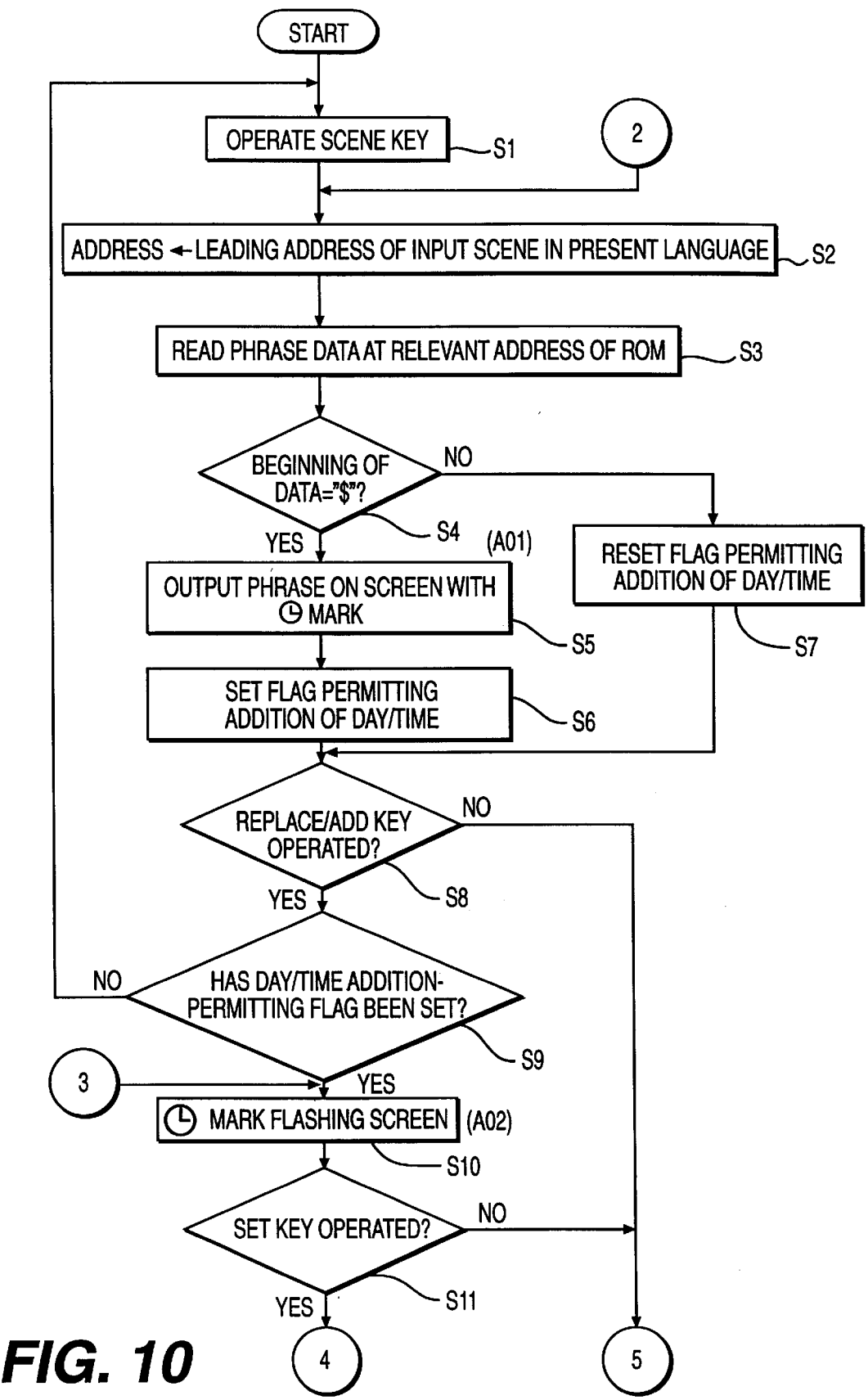
FIG. 10 is a diagram illustrating a portion of a flowchart of the processing operation in accordance with the embodiment of the language-information providing apparatus of the present invention.

As shown in FIG. 10, if it is determined that one of the scene keys 20 has been pressed (Step S1), a leading address of the memory area of the scene set by the scene key in the present language is designated as the address in the ROM 9, as shown in FIG. 3 (Step S2). Then, the phrase data is read out from the address in the ROM 9 (Step S3).

Next, a determination is made as to whether data on the $ mark, indicating whether or not the phrase data is a sentence, word or phrase permitting addition, is attached to the beginning of the phrase data read out (Step S4).

If the $ mark is attached to the beginning of the data, the operation proceeds to Step S5, the phrase is outputted and displayed on the display 7 in the selected language in a state in which the clock mark, indicating that it is an addition-permitting phrase, is attached to the data on the display. Then, the area in the work RAM 3 of the flag permitting the addition of the day and time is set in a state of "flag set" (Step S6).

On the other hand, if the $ mark is not present at the beginning of the phrase data read out from the ROM 9, the operation proceeds from Step S4 to Step S7, and the day/time-addition permitting flag area in the work RAM 3 is set in a state of "flag reset."

After Step S6 and Step S7, the operation proceeds to Step S8 to determine whether the replace/add key 41 has been pressed. If it is determined in Step S8 that the replace/add key 41 has been pressed, whether or not the flag has been set is determined from the state of the day/time-addition permitting flag area in the work RAM 3 (Step S9). If the flag has been set, the clock mark M, i.e., the addition-permitting mark, is made to flash (Step S10).

Subsequently, a determination is made as to whether or not the set key 42 has been pressed (Step S11). If so, the day/time setting screen (the aforementioned screen A04) is displayed (Step S12). Then, the value of the day in the day memory area in the work RAM 3, the value of the hour in the hour memory area therein, and the value of the minute in the minute memory area therein are all reset to 0 (Steps S13, S14, and S15). Further, the p.m. flag for a.m. and pm. is reset (Step S16). Subsequently, the day-setting portion on the screen of the display 7 is flashed and displayed (Step S17).

Then, a determination is made as to whether the up key Kup or the down key Kdw among the cursor keys KS has been pressed (Step S18). If it is determined that either of them has been pressed, the day setting is made to undergo scrolling to display "1 nichi (on the 1st)" to "31 nichi (on the 31st)" from the ROM 9 (Step S19), and the value is consecutively displayed in the flashing portion for setting the day.

Figure 11:
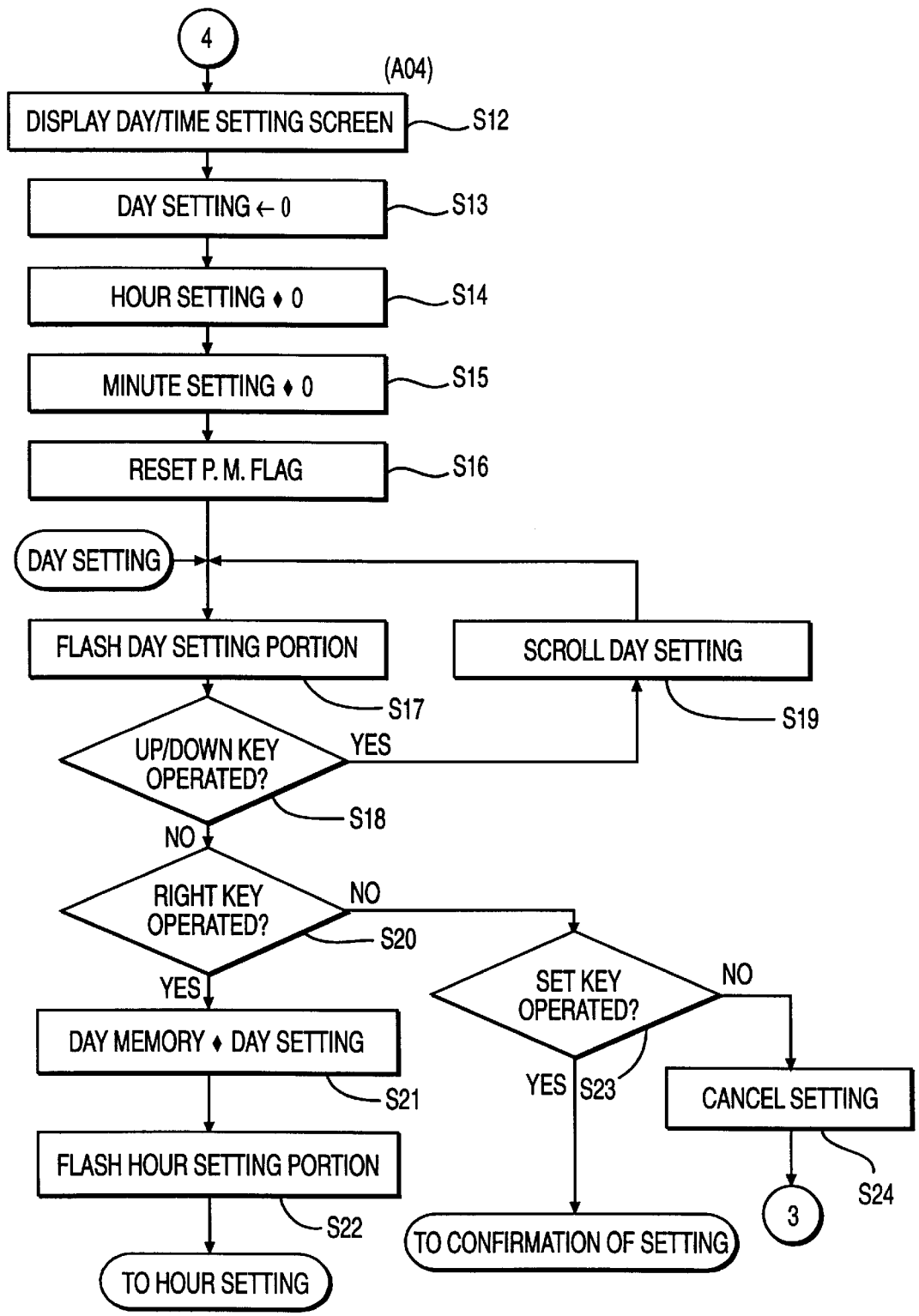
FIG. 11 is a diagram illustrating a continuation of the flowchart of the processing operation in accordance with the embodiment of the language-information providing apparatus of the present invention.

At this time, the day setting is a count value of a counter which consecutively counts up each time the down key Kdw is pressed, and counts down each time the up key Kup is pressed. The day setting is reset in Step S13 in FIG. 11, and its initial value is 0, and when the day setting is 0, the display value on the display 7 is blank. Then, when the day setting becomes 1 or more, the day data is read out from the address at which the day setting is added to the (leading address −1) (which becomes an offset value of the day data address in FIG. 3) of the day data area in the ROM 9. In other words, if the day setting is "1", the day data is "1 nichi" or "on the 1st," and if the day setting is "31", the day data is "31 nichi" or "on the 31st."

If it is determined that neither the up key Kup or the down key Kdw has been pressed, but the right key Krt has been pressed (Step S20), the current day setting is registered in the day memory area of the RAM 3 (Step S21). Then, the time-setting portion on the day/time setting screen of the display 7 is flashed and displayed (Step S22). Subsequently, the operation proceeds to a time setting routine, which will be described later.

On the other hand, if it is determined in Step S20 that the right key Krt has not been pressed and the set key 42 has been pressed (Step S23), the setting is confirmed. Unless the cursor keys KS or the set key 42 are pressed for a predetermined time or more, the setting is canceled (Step S24), and the operation returns to Step S10 to assume the screen A02 in which the clock mark M flashes.

If it is determined in Step S9 that the day/time-addition permitting flag has not been set, although it was determined in Step S8 that the replace/add key 41 was pressed, it means that the phrase being displayed on the display 7 is not a phrase permitting the addition of the day and time, so that the operation returns to the starting point of this routine.

Figure 12:
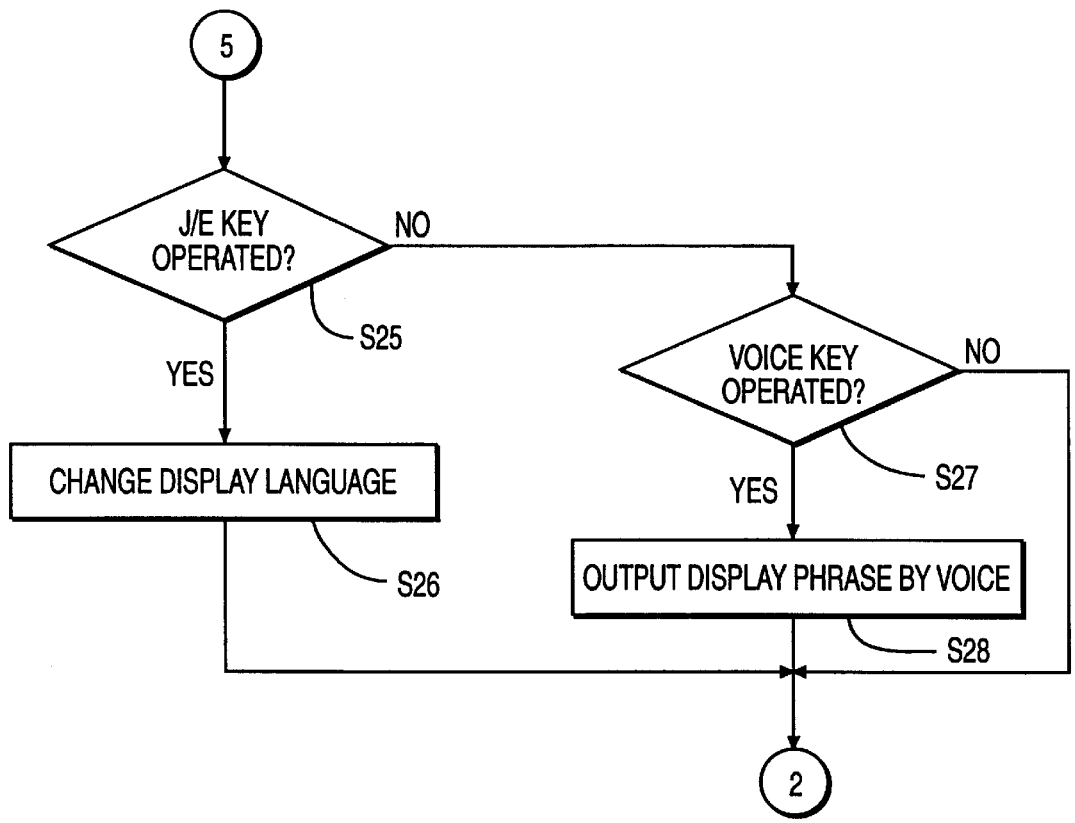
FIG. 12 is a diagram illustrating a continuation of the flowchart of the processing operation in accordance with the embodiment of the language-information providing apparatus of the present invention.

Meanwhile, if it is determined in Step S8 that the replace/add key 41 has not been pressed, and it is not determined in Step S11 that the set key has been pressed, a determination is made as to whether or not the Japanese/English key 43 has been pressed, as shown in FIG. 12 (Step S25).

Then, if it is determined that the Japanese/English key 43 has been pressed, the display language being displayed on the display 7 is changed over (Step S26), whereupon the operation returns to Step S2. If it is determined that not the Japanese/English key 43 but the voice key 45 has been pressed (Step S27), the display phrase being displayed on the display 7 is outputted in the voice of the language being displayed (Step S28). Subsequently, the operation returns to Step S2.

Figure 13:
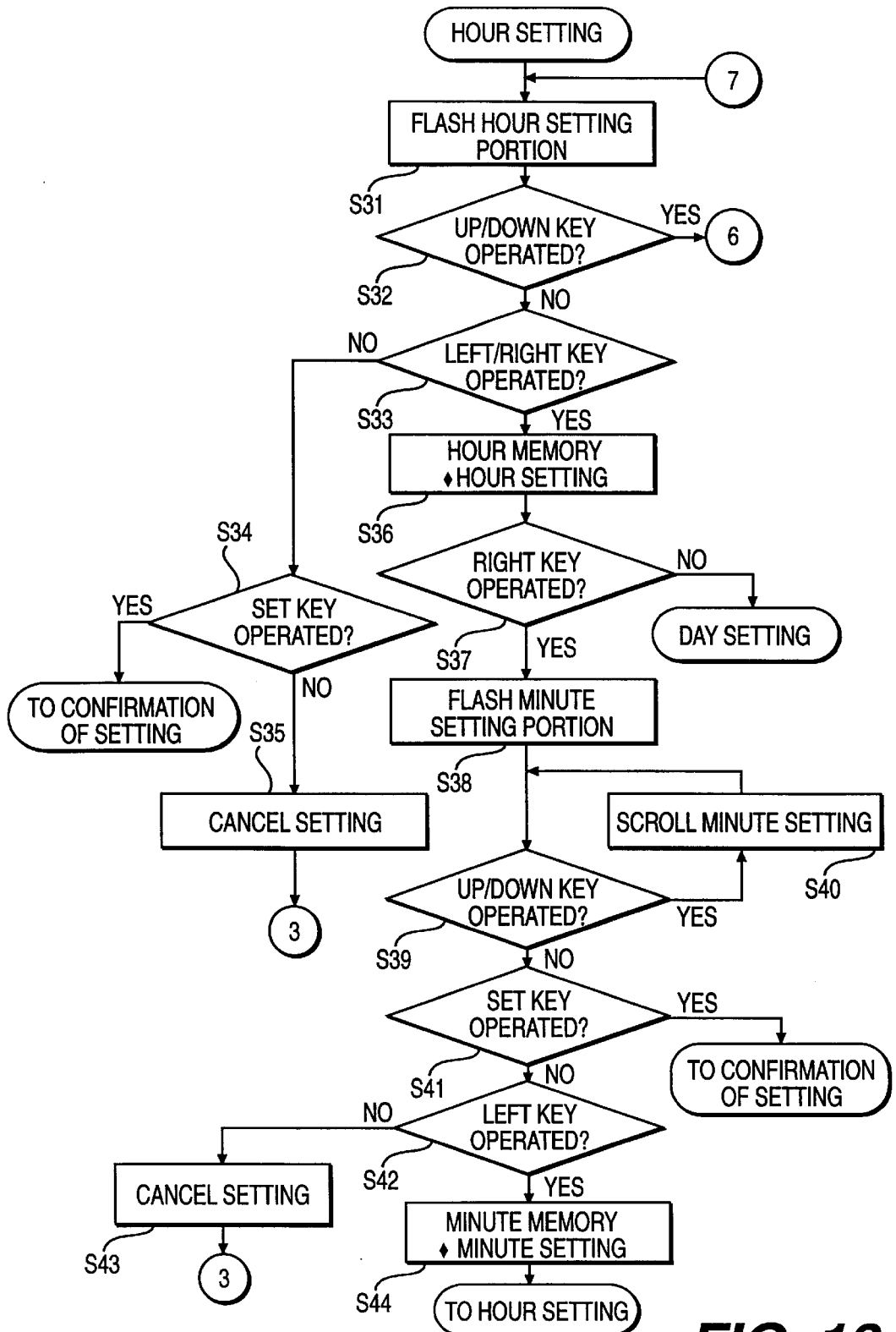
FIG. 13 is a diagram illustrating a continuation of the flowchart of the processing operation in accordance with the embodiment of the language-information providing apparatus of the present invention.

The foregoing is processing for setting the day, and a description will next be given of a routine for setting the time shown in FIG. 13.

Figure 14:
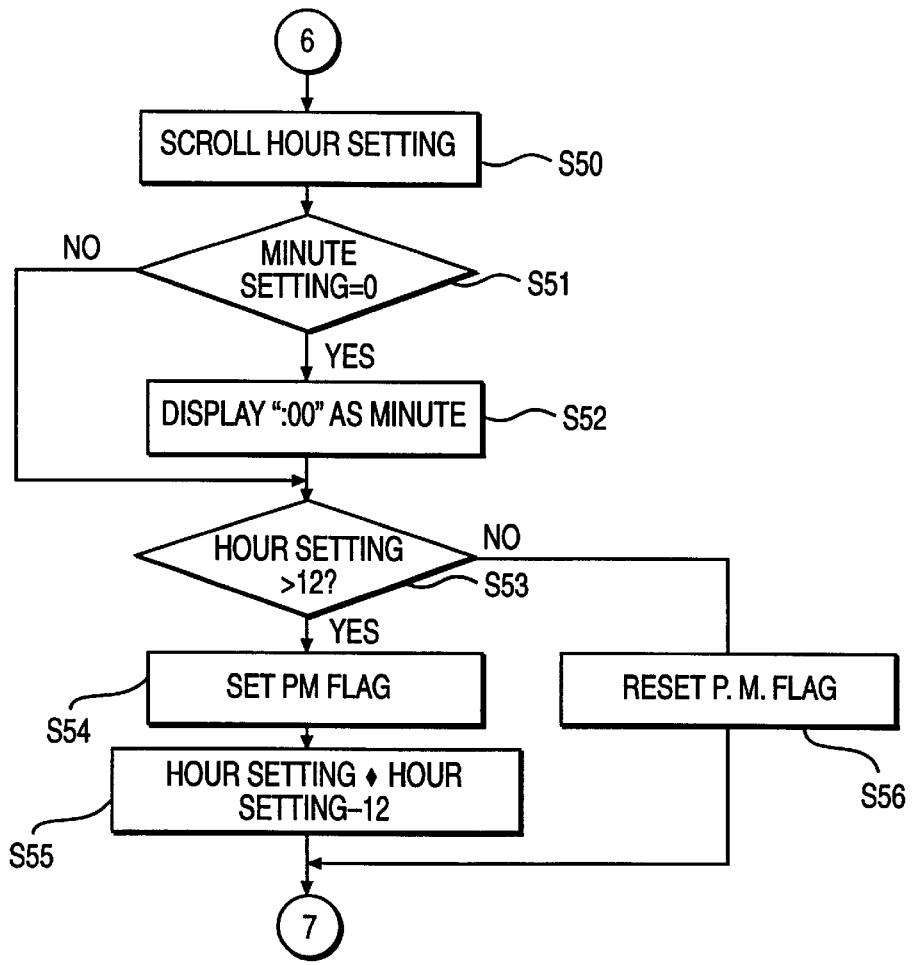
FIG. 14 is a diagram illustrating a continuation of the flowchart of the processing operation in accordance with the embodiment of the language-information providing apparatus of the present invention.

First, in Step S31, the "hour" setting portion in the setting item "time" flashes in the day/time setting screen A04. If the user correspondingly operates the up key Kup or the down key Kdw, the operation proceeds to the routine shown in FIG. 14, and the hour-setting is made to undergo scrolling in Step S50.

In this case, the hour setting is a count value of a counter which consecutively counts up each time the down key Kdw is pressed, and counts down each time the up key Kup is pressed. Since this hour setting has been reset in Step S14 in FIG. 11, its initial value is 0, and when the hour setting is 0, the display value on the display 7 is blank.

Then, as the hour setting becomes 1 or more by pressing the down key, the hour data is read out from the address at which the hour setting is added to the (leading address −1) (which becomes an offset value of the hour data address in FIG. 3) of the hour data area in the ROM 9. That is, if the hour setting is "1," the hour data is "1 ji" or "1," and if the hour setting is "12," the hour data is "12 ji" or "12."

Next, in Step S51, a determination is made as to whether or not the minute setting is 0. If the minute setting is 0, the operation proceeds to Step S52, and ":00" is displayed in the "minute" portion on the display 7. On the other hand, if the minute setting is not 0 and has been set in advance, and after Step S52, the operation proceeds to Step S53 to determine whether or not the hour setting has exceeded 12.

In this case, although only 1 to 12 are prepared in the ROM 9 as the data on "time," during this scrolling, the hour setting assumes a value up to "24." Then, when the hour setting has exceeded 12, it means p.m., so that if this is detected in Step S53, the operation proceeds to Step S54 to set the p.m. flag (the flag for indicating a.m. or p.m.) in the RAM 3. Then, in Step S55, a value in which 12 is subtracted from that hour setting is set as the hour setting.

On the other hand, if the hour setting is 12 or less, the operation proceeds to Step S56 to reset the p.m. flag. After Steps S55 and S56, the operation returns to Step S31 in FIG. 13. Thus, the hour setting is set by a loop comprising Steps S31, S32, S50, . . . , S56, . . . , S31.

Figure 15:
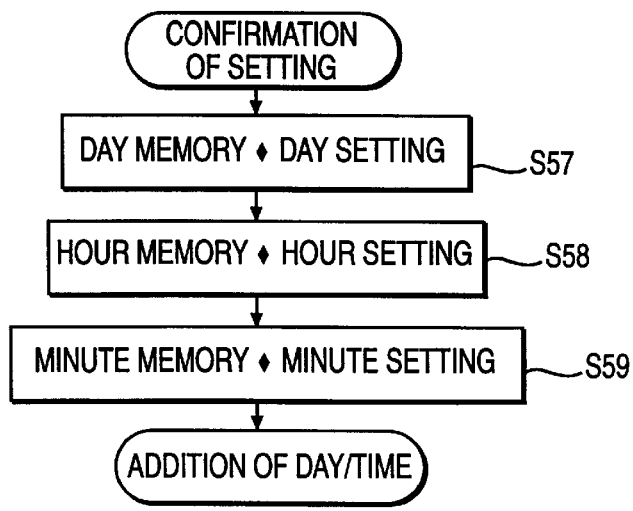
FIG. 15 is a diagram illustrating a portion of a flowchart of the processing operation in accordance with the embodiment of the language-information providing apparatus of the present invention.

Next, if it is determined that not the left key or the right key but the set key has been pressed in the hour setting screen (Steps S33, S34), the operation proceeds to a setting confirming routine. The setting confirming routine is shown in FIG. 15. A description will be given of this routine later.

If it is determined in Step S34 that the set key has not been pressed, the operation proceeds to Step S35 to cancel the setting, and the operation returns to Step S10 in FIG. 10 and returns to the phrase display in which the clock mark M flashes.

Meanwhile, if it is determined that not the up key Kup or the down key Kdw but the left key Kft or the right key Krt among the cursor keys KS has been pressed on the hour setting screen (Step S33), the hour setting at that time is stored in the hour memory area of the RAM 3 (Step S36).

After storing this hour setting value in the RAM 3, the operation proceeds to Step S37, and a determination is made as to whether or not the entered key is the right key Krt. If it is determined that it is not the right key Krt, i.e., it is the left key Kft, this means the setting of the day, so that the operation returns to the day-setting portion, i.e., Step S17, in FIG. 11. On the other hand, if it is determined in Step S37 that the right key Krt has been pressed, this means the setting of the "minute" setting portion, so that the minute-setting portion starts to flash in Step S38.

Subsequently, a determination is made as to whether or not the up key Kup or the down key Kdw has been pressed. If it is determined that the up key Kup or the down key Kdw has been pressed, the minute setting value is made to undergo scrolling (Step S40). In the scrolling of this minute setting as well, in the same way as the day setting, the minute setting is reset to 0 in Step S15, the counter consecutively counts up from 0 or counts down as the up key Kup or the down key Kdw is operated, thereby assuming a value of 1 to 59 as the count value.

Then, if neither the up key Kup nor the down key Kdw but the set key 42 is pressed (Step S41), the operation proceeds to the routine for confirming the setting. On the other hand, if it is determined that neither the up key Kup nor the down key Kdw has been pressed, and the set key has not been pressed, but the left key Kft has been pressed (Step S42), this means a return to the setting of the time portion, so that, in Step S44, the minute setting is stored in the minute memory area of the RAM 3. Subsequently, the operation returns to the routine for setting the time, i.e., Step S31.

Meanwhile, if it is determined in Step S42 that the entry by the left key Kft has not been made either, the setting is canceled, and the operation returns to Step S10 in FIG. 10, so as to return to the screen of phrase display in the state in which the clock mark flashes.

A description will be given of the routine for confirming the setting shown in FIG. 15.

The routine for storing in each area of the RAM 3 the values respectively confirmed by the above-described setting of the day, hour, and minute is this routine for confirming the setting. As described before, the operation proceeds to this setting-confirming routine when the set key 42 is pressed.

In this setting-confirming routine, a day setting, i.e., any of the values 0 to 31, is first stored as the day setting in the day memory area of the RAM 3. Next, in Step S58, the above-described hour setting is stored as the hour setting in the hour memory area of the RAM 3. Finally, in Step S59, the minute setting is stored in the minute memory area of the RAM 3. After the confirmation of the settings, the operation proceeds to a day/time adding routine, which is a routine for adding confirmed day/time data.

Figure 16:
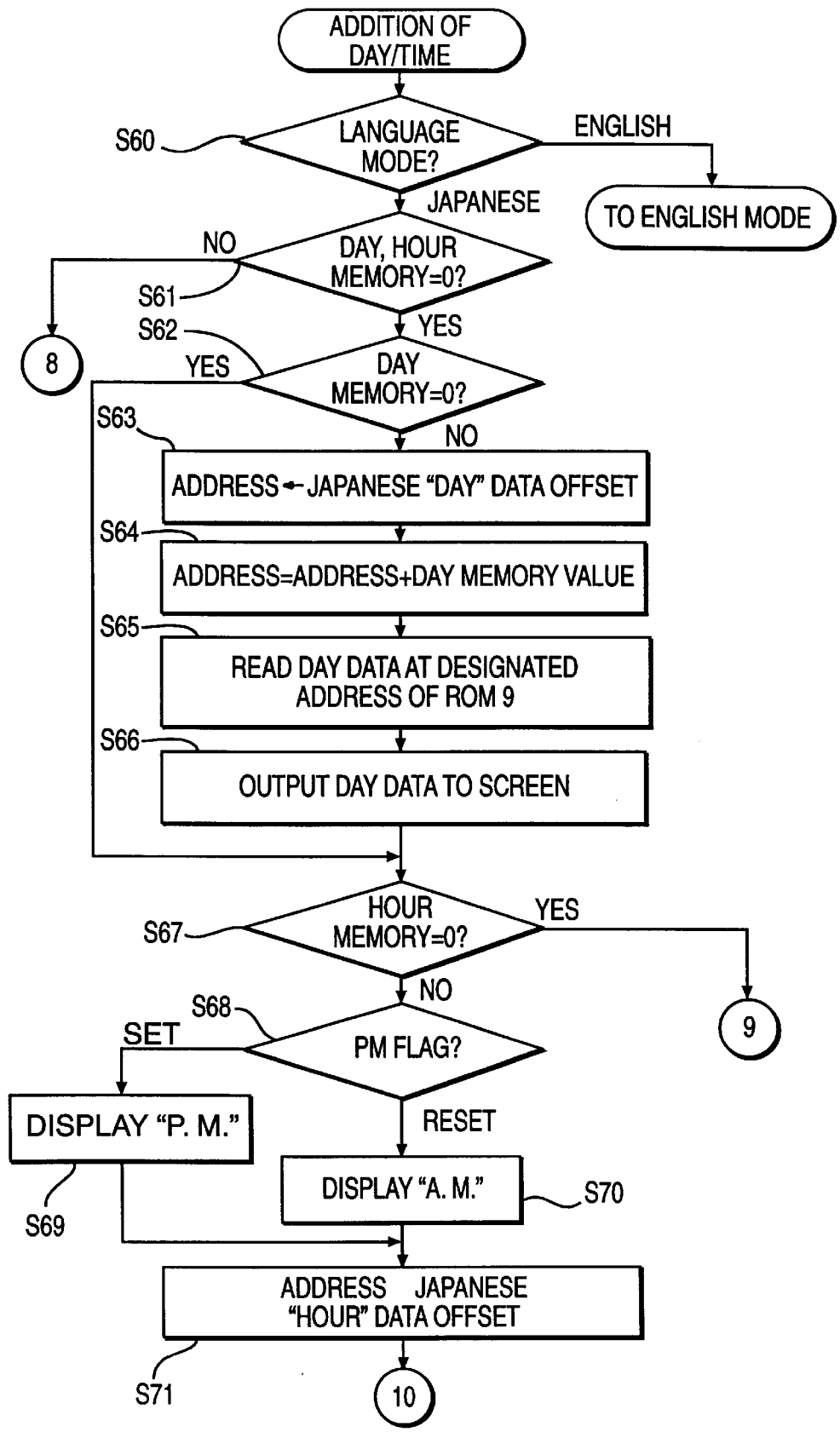
FIG. 16 is a diagram illustrating a continuation of a flowchart of the processing operation in accordance with the embodiment of the language-information providing apparatus of the present invention.
Figure 17:
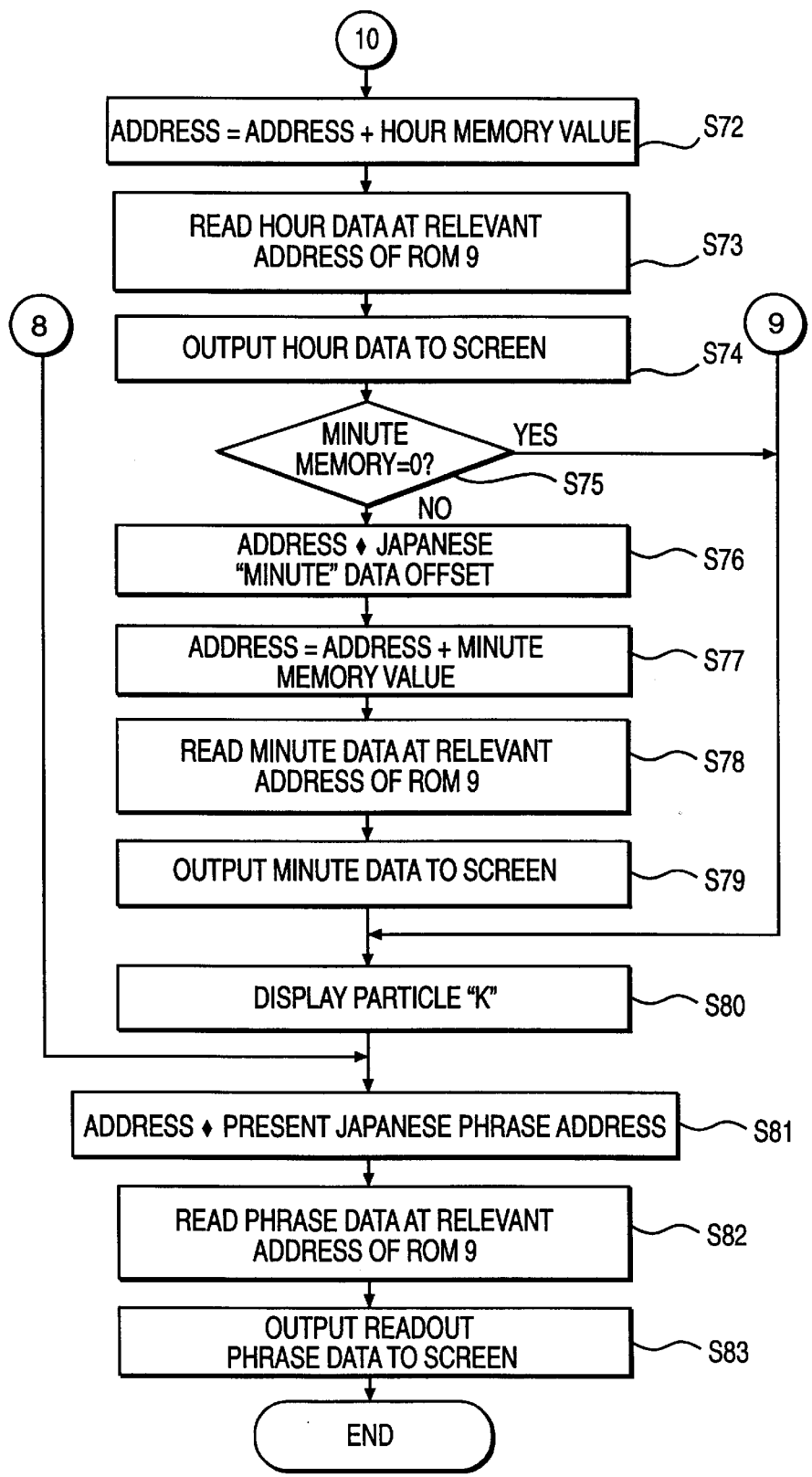
FIG. 17 is a diagram illustrating a continuation of the flowchart of the processing operation in accordance with the embodiment of the language-information providing apparatus of the present invention.

FIGS. 16 and 17 are flowcharts illustrating the day/time adding routine.

Namely, first, in Step S60, a determination is made as to whether the present language mode is Japanese or English. If it is English, the operation proceeds to the English mode shown in FIG. 18. If it is Japanese, the operation proceeds to Step S61 to determine whether the day setting in the day memory area of the RAM 3 and the hour setting in the hour memory area thereof are not 0.

If both the day setting and the hour setting are 0, the operation jumps to Step S81 in FIG. 17 where the address in the ROM 9 is set to the address of the present Japanese phrase, and the phrase data at that address is read out from the ROM 9 (Step S82) and outputted to the screen (Step S83). Namely, since the day/time data is 0, it is assumed that there is no information to be added, so that the original phrase data is displayed as it is. This completes the routine for setting and adding the day and time.

Meanwhile, if it is determined in Step S61 that the day setting or the hour setting is not 0, the operation proceeds to Step S62 to determine whether or not the day setting is 0. If the day setting is not 0, the address offset value of the Japanese day data, shown in FIG. 3, is set as the address in the ROM 9.

Next, in Step S64, an address value in which the day setting is added to the address set in Step S63 is set as the address in the ROM 9. As shown in FIG. 3, since day data is stored at each address value which is consecutively counted up from the address offset value, the address value in which this day setting is added is an address for reading the day data corresponding to the day setting.

Accordingly, in Step S65, the day data at the address designated in Step S64 is read out from the ROM 9. Then, in Step S66, the day data thus read out is outputted to the display 7.

In Step S62, if it is determined that the day setting is 0, Steps S63 to S66 are skipped, and the operation proceeds to Step S67. In Step S67, a determination is made as to whether the hour setting is 0. If the hour setting is 0, the operation proceeds to Step S80 in FIG. 17 to display a connective particle "ni." That is, the connective particle "ni" is displayed next to the day setting.

Then, in Steps S81 to S83, in the same way as described above, the present Japanese phrase is read out and outputted to the display 7. As a result, as shown in the aforementioned screen A05, a phrase in which in which the connective particle "ni" is displayed after the day is displayed on the display 7, and the phrase in which the day data is added is displayed. In other words, for example, a sentence is displayed in which the day information and the connective particle "5 (itsu)ka ni (on the 5th)" is added to the original phrase "engeki o mitai no desuga (I'd like to see a play)," with the result that the day/time data-added sentence "5 (itsu)ka ni engeki o mitai no desuga (I'd like to see a play on the 5th)" is displayed.

Next, if it is determined in Step S67 that the hour setting is not 0, the operation proceeds to Step S68 to determine the state of the p.m. flag in the RAM 3, indicating which of a.m. and p.m. is to be displayed. If this flag has been set, the operation proceeds to Step S69 to display "p.m." after the day data.

On the other hand, if the flag has been reset, the operation proceeds to Step S70 to display "a.m." after the day data on the display 7. Then, the operation proceeds to Step S71 to set the address value in the ROM 9 to the offset address value of the Japanese hour data. Subsequently, the operation proceeds to Step S72 to set an address value in which the hour setting is added to that address value. Set hour data is stored at the address in the ROM 9 in which this hour setting is added.

Accordingly, in Step S73, the hour data at the relevant address is read out from the ROM 9, and in Step S73, the hour data thus read out is outputted to a position on the display 7 following the portion which was being displayed until then.

Next, a determination is made as to whether the minute setting is 0 (Step S75). If it is 0, the operation proceeds to Step S80 to display the connective particle "ni." Subsequently, in Steps S81 to S83, the present Japanese phrase which was being displayed until then is read out, with the result that, for example, "5 (itsu)ka no 5 ji ni engeki o mitai no desuga (I'd like to see a play at 5 o'clock on the 5th)", is displayed on the screen of the display 7.

If it is determined in Step S75 that the minute setting is not 0, in Step S76, the address value in the ROM 9 is set to the address offset value of the Japanese minute data. Next, in Step S77, the minute setting in the RAM 3 is added to that address value so as to set the address in the ROM 9. This address value serves as an address for reading out the set minute data itself.

Accordingly, in Step S78, the minute data at that address is read out from the RAM 9, and in Step S79, the minute data is outputted to the position on the display 7 following the portion which was being displayed previously. Subsequently, the operation proceeds to Steps S80 to S83 to display the connective particle "ni" and to consecutively display the present Japanese phrase. Consequently, in this case, a phrase in which information on the day, hour, and minute is added, e.g., "5 (itsu)ka gogo 5 ji 30 pun ni engeki o mitai no desuga (I'd like to see a play at 5:30 p.m. on the 5th)," is composed and displayed, as shown on a screen A051 in FIG. 9.

Figure 18:
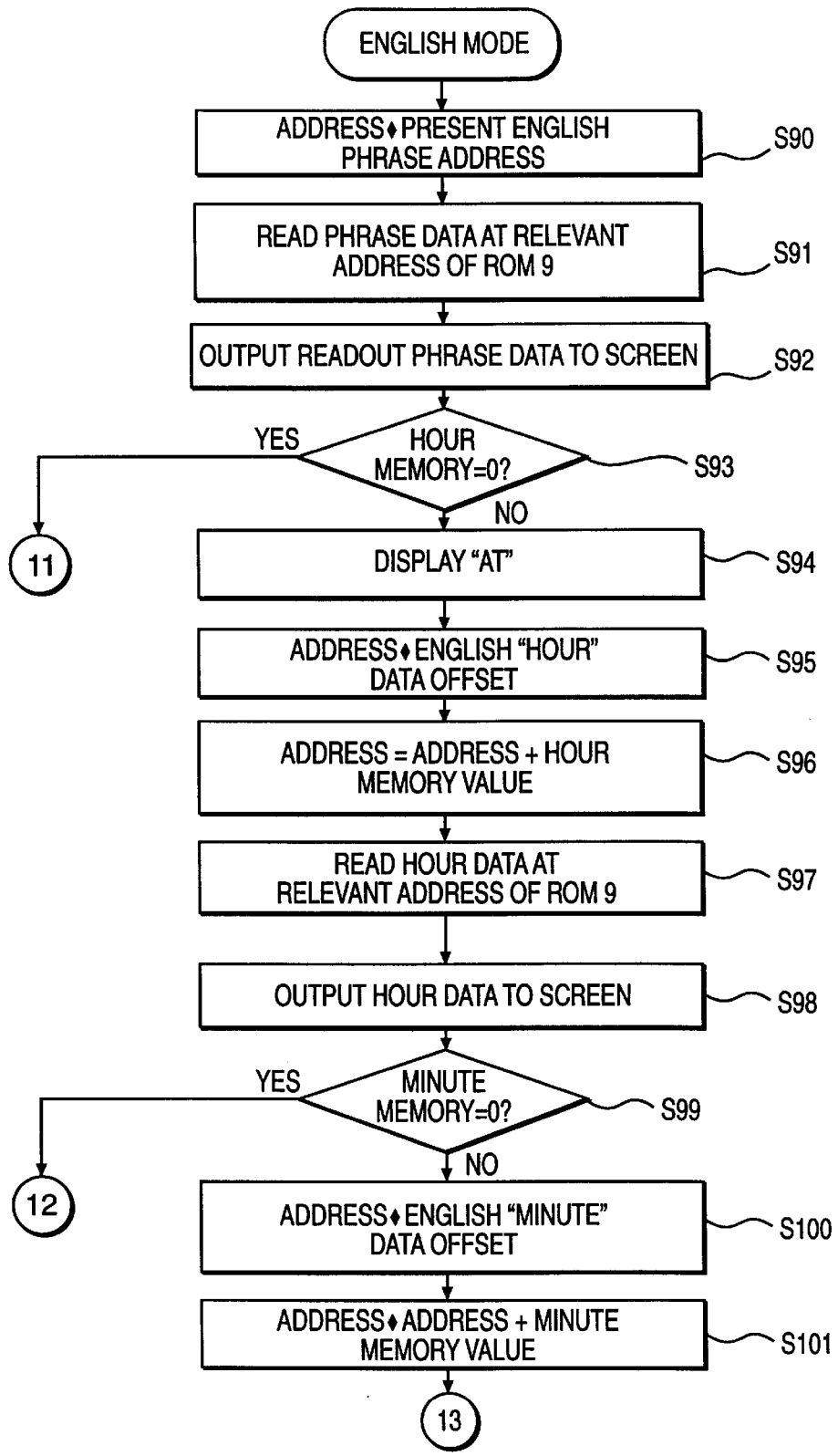
FIG. 18 is a diagram illustrating a continuation of the flowchart of the processing operation in accordance with the embodiment of the language-information providing apparatus of the present invention.
Figure 19:
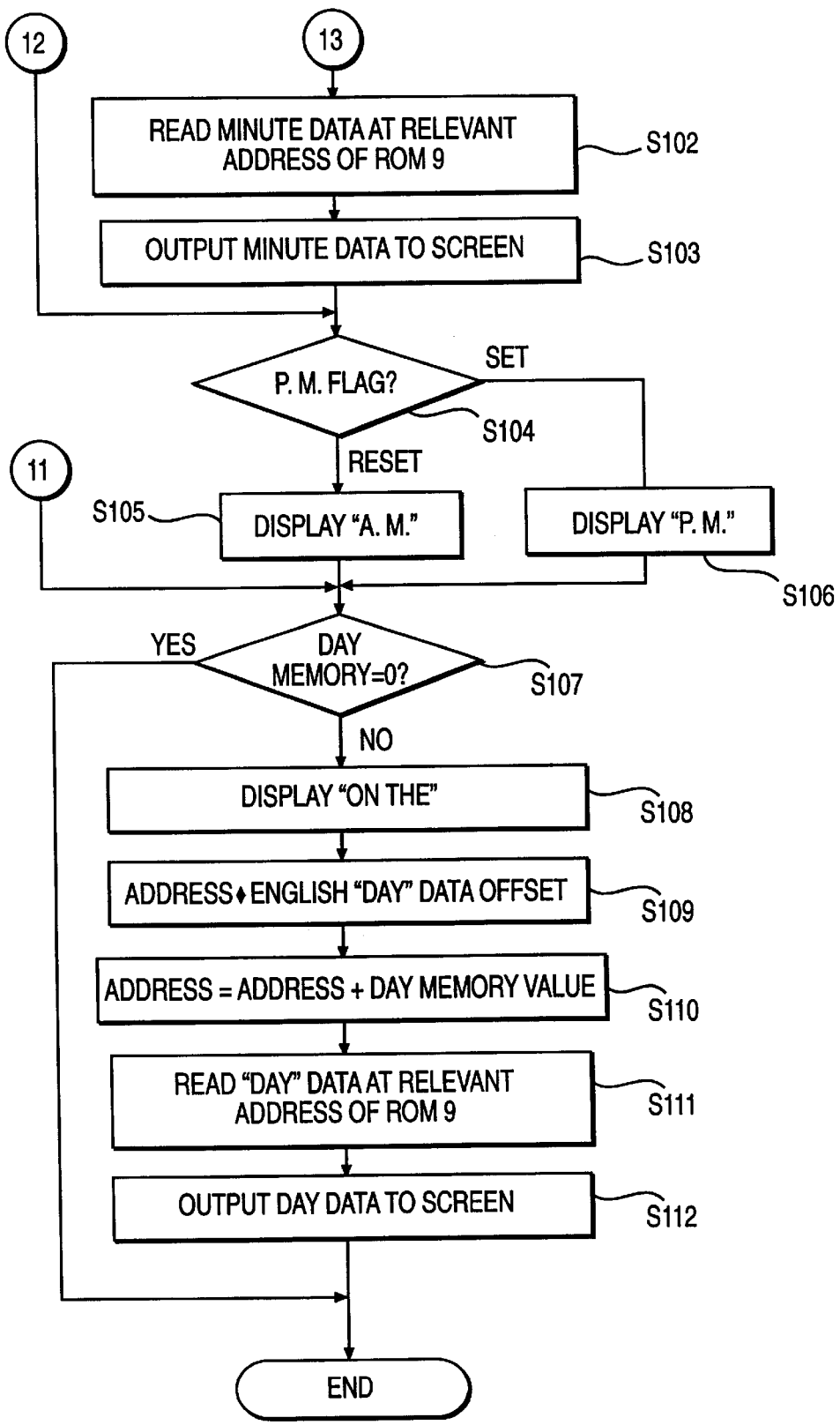
FIG. 19 is a diagram illustrating a continuation of the flowchart of the processing operation in accordance with the embodiment of the language-information providing apparatus of the present invention.

Next, a description will be given of an English-mode routine in a case where it is determined in Step S60 for the day/time adding routine that the language mode is that of English. FIGS. 18 and 19 show this English-mode routine.

In this English mode, control is provided such that after English phrases are first displayed consecutively on the display 7, data on the set day, hour, and minute is displayed at the end of a sentence.

Namely, first, in Step S90, the present English phrase address is set as the address in the ROM 9. Then, the operation proceeds to Step S91 to read out the phrase data at that address, and, in Step S92, the phrase data is outputted to the display 7.

Next, in Step S93, a determination is made as to whether the value of the hour memory is 0. If the value of the hour memory is 0, the operation jumps to Step S107 in FIG. 19 to determine whether or not the value of the day memory is 0. If the value of the day memory is 0, this routine ends. That is, in this example, it is assumed that only the minute setting is not added, and that the day/hour information is not added if both the hour setting and the day setting are 0, so that the relevant English phrase alone remains displayed.

On the other hand, if it is determined in Step S107 that the day setting is not 0, in Step S108, "on the" is displayed next to the English phrase being presently displayed.

Next, in Step S109, the address in the ROM 9 is set to the offset address value of the English day data. Then, in Step S110, the address in the ROM 9 is set to one in which the day setting is added to the value set to the offset value. This designates the address at which the day data on the value of the day set as described above is stored.

Accordingly, in Step S111, the day data at the relevant address is read out from the ROM 9, and, in Step S112, the day data is outputted to the display 7. This corresponds to the display of the screen A072 shown in FIG. 9, and "on the 5th" is displayed at the end of the English phrase.

Next, if it is determined in Step S93 that the hour setting is not 0, the operation proceeds to Step S94 to display "at" at the end of the English phrase being presently displayed.

Then, the operation proceeds to Step S95, and the address in the ROM 9 is set to the offset address value of the English hour data. The operation then proceeds to Step S96 so as to set a read address in the reading ROM 9 as the relevant offset address +hour setting. This designates the address at which the data on the set hour is stored in the above-described manner.

Accordingly, in Step S97, the hour data at the relevant address is read out from the ROM 9, and in Step S98, the hour data is outputted to the position on the display 7 following the aforementioned "at."

Next, the operation proceeds to Step S99 to determine whether the minute setting is 0. If the minute setting is 0, the operation proceeds to Step S104 to determine whether the p.m. flag for a.m. or p.m. has been set. If set, "pm." is displayed after the relevant hour data (Step S106). On the other hand, if the p.m. flag has been reset, in Step S105, "a.m." is displayed. Then, the operation proceeds to Step S107 to determine whether the day setting is 0.

As a result, if the minute setting is 0, even if the hour setting is not 0, "at" is displayed after the English phrase, and a numeral value of the hour is displayed after that, and "a.m." or "p.m." for indicating a.m. or p.m. is displayed. Then, if the day setting is 0, a period is displayed after that, and only the hour becomes the adding data. Meanwhile, if the day setting is not 0, data on the day, such as "on the 5th," is also added following the hour.

Furthermore, if the minute setting is not 0 in Step S99, in Step S100, the offset address value of the English minute data is set as the address value in the ROM 9. Then, in Step S101, the minute setting stored in the RAM 3 is added to this offset address value. Therefore, this address value designates the address at which the data for expressing the set minute is stored. Thus, in Step S102, the minute data at the relevant address is read out from the ROM 9, and in Step S103, the minutes data is outputted to the display 7.

As shown in FIG. 3, at the beginning of the minute data, ":" is added in front of the numerical value expressing the minute. Subsequently, the operation proceeds to Step S104 to determine the set or reset state of the p.m. flag in the above-described manner. In addition, a determination is made as to whether "day" is added, depending on the day setting.

As a result, in the case of the state in which day data is not present, for example, "at" is displayed after the English phrase, a numerical value of the "hour" is displayed after that followed by ":". Then, a number representing the numerical value of the "minute," and "p.m." or "a.m." is displayed at the end to complete the sentence. Meanwhile, if the day setting is not 0, as shown in the screen A071 in FIG. 9, a phrase of the hour, minute, a.m. or pm., as well as a phrase expressing the day are displayed after "at."

In the above-described manner, data in which the hour, minute, and day is set is added at the end of the English phrase as set, and a necessary preposition is also added, thereby completing the sentence. It should be noted that the original phrase itself is also an independent sentence.

Moreover, in this case, it is not necessary to set all of the "day," "hour," and "minute," and by setting only necessary items, necessary addition is carried out so as to complete an appropriately added sentence.

Either of the language modes to be used can be changed by pressing the Japanese/English key 43, as described before.

The above example is one in which data on the "day" and "time" is added to a phrase which itself is one sentence, and it is, of course, possible to add the "year," "month," and "day" instead of the "day" and "time."

Figure 20:
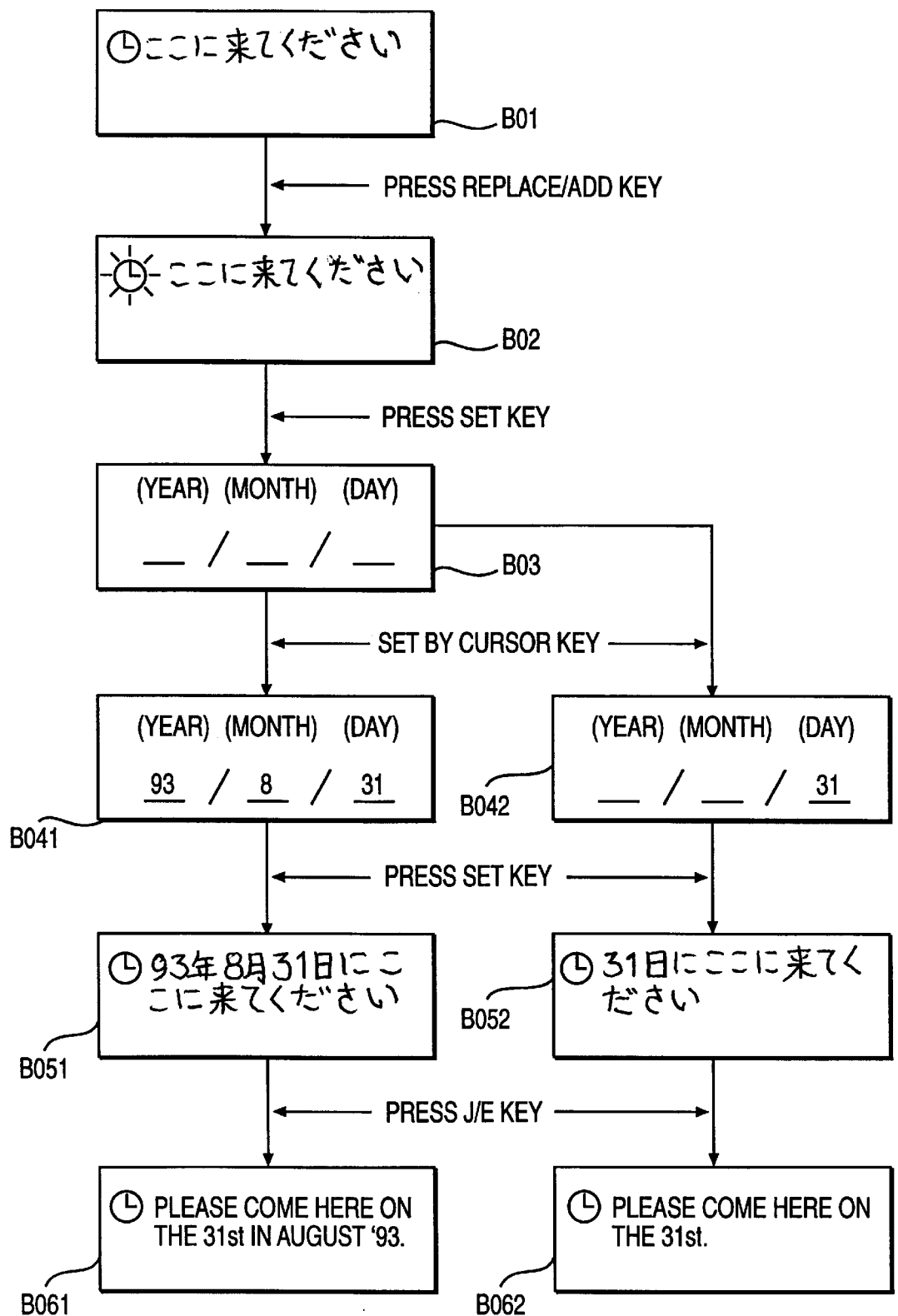
FIG. 20 is a diagram illustrating another example of display in accordance with the embodiment of the language-information providing apparatus of the present invention.

FIG. 20 is a diagram in which processing for adding information on the "year," "month," and "day" to a predetermined phrase is illustrated as the flow of change in the screen at that time.

In the case where the "year," "month," and "day" are added, numerical values placed in the last two digits of the dominical year and headed by an apostrophe, i.e., "'00" to "'99," are stored in the ROM 9 as data on the "year," data on "January" to "December" is stored therein as data on the "month," and data on "1st" to "31st" is stored therein as data on the "day," in the same way as in the above-described case.

Then, in the same way as the example where the aforementioned "day" and "time" information is added, a selecting and setting operation is performed such that the respective values of the "year," "month," and "day" are consecutively scrolled by the up key '(up and the down key Kdw among the cursor keys KS, and are respectively set by the set key 42.

Then, if the set key 42 is pressed in the state in which desired settings are displayed, the respective settings of the "year," "month," and "day," which are being displayed on the screen of the display 7, are stored in the RAM 3 in the same way as the above-described example. Subsequently, in the same way as the above-described example, the operation returns to the screen of the original phrase display to display a phrase by adding the set year, month, and day to the phrase being displayed.

That is, in FIG. 20, the screen B01 shows a state of the phrase display after a predetermined scene key is pressed. In the same way as described above, the clock mark M shows that this phrase is a phrase permitting addition. If the replace/add key 41 is pressed in the state of this screen B01, the screen changes to a screen B02 in which the clock mark, which indicates that the sentence is one permitting addition, flashes.

As a result, the user is informed of the fact that it is possible to add the "year," "month," and "day." If the user presses the set key 42 in this state, the screen changes to a screen B03 for setting the "year," "month," and "day." As shown in FIG. 20, in an initial state, the respective values of the "year," "month," and "day" are blank.

On this screen B03 for setting the "year," "month," and "day," if the respective values of the year, month, and day are set by the up key Kup, the down key Kdw, the left key Kft, and the right key Krt, the screen changes to a screen B041 or B042 shown in FIG. 20. Thus, if the set key 42 is pressed again in the screen B041 or B042 on which desired settings are displayed, the respective settings of the year, month, and day which were being displayed on the screen B041 or B042 are stored in the RAM 3.

Subsequently, as shown in FIG. 20, the state of the display 7 becomes that of a screen of the phrase display, and becomes that of a screen B051 or B052 in which a phrase with the set "year," "month," and "day" added to the initially displayed phrase is displayed. If the Japanese/English key 43 is pressed in this state, if the language being presently displayed is Japanese, a translated phrase in English is displayed as shown in a screen B061 or B062.

In the case of the "year," "month," and "day" as well, in the same was as the above-described information on the "day" and "time," if the display language is Japanese, respective settings are added to the beginning of the phrase of the scene stored in the ROM 9 in the order of the "year," "month," and "day." If the display language is English, on the other hand, settings are added to the end of the English phrase in the order of the "day," "month," and "year." In this case, if the display language is Japanese, an added sentence is completed by adding "ni" as a particle after the "year," "month," and "day." On the other hand, if the display language is English, "on the" is added in front of the data on the "day," "in" is added in front of the "month," and a "'numerical value" is finally displayed as the data on the "year."

In addition, as also shown in FIG. 20, in this case as well, as for items whose setting is to be omitted, among the "year," "month," and "day," if the set key 42 is pressed with such items left blank, an added sentence is prepared in which the items to be omitted are, in fact, omitted. In the example of FIG. 20, a case in which only the day is set, is illustrated.

As described above, it is possible to display a sentence by preparing a phrase with a desired day and time or a desired year, month, and day added thereto. Then, in the screen displaying the phrase, if the voice key 45 is pressed when English is being displayed, after the proper phrase is pronounced, voice is produced in the order of the day, month, and year, or in the order of the hour, minute, and day, thereby making it possible to obtain a voice output. When Japanese is being displayed, voice is produced in the order of the year, month, and day, or in the order of the day, hour, and minute, thereby making it possible to obtain a voice output of a desired added sentence.

Figure 21:
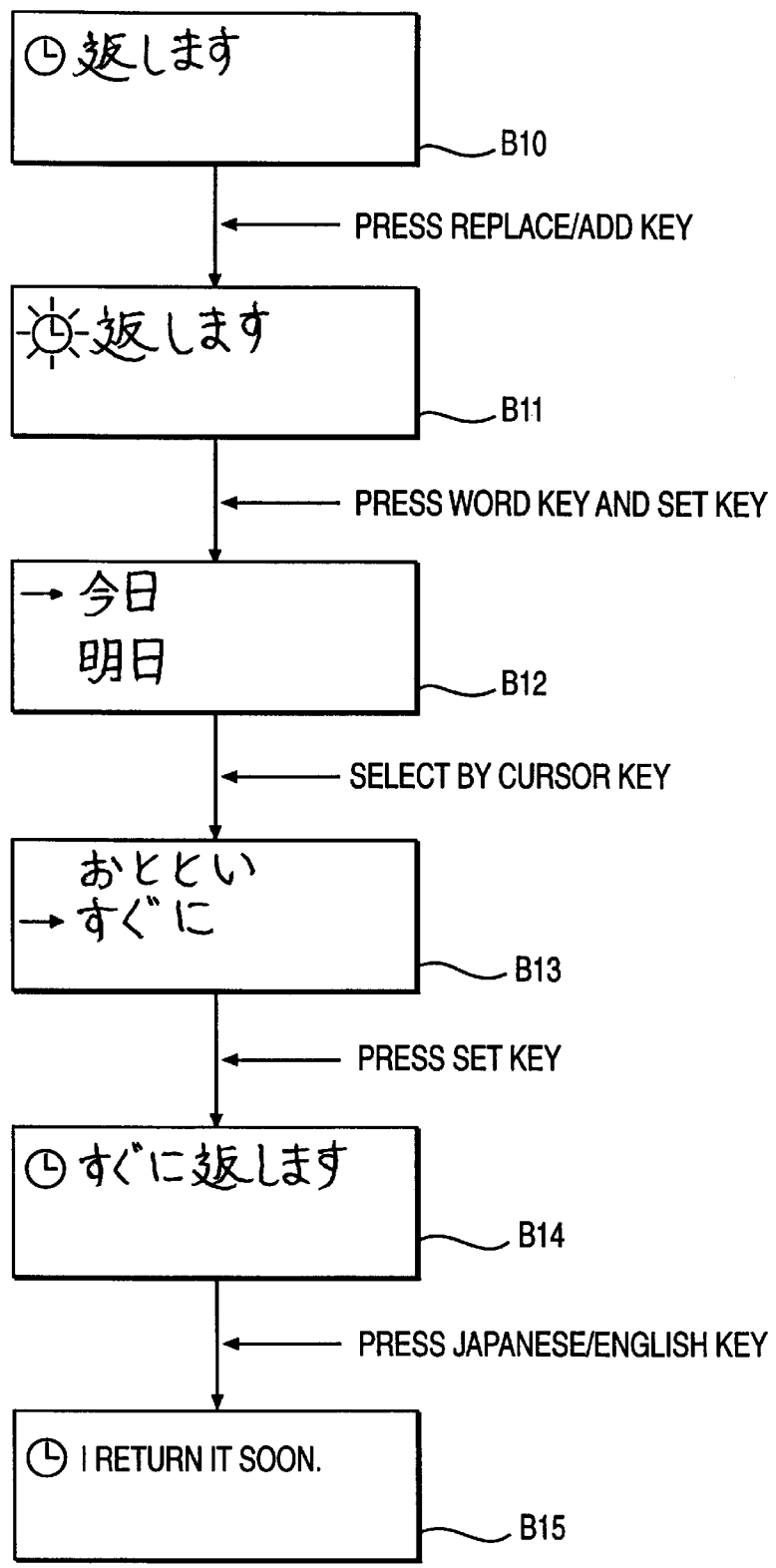
FIG. 21 is a diagram illustrating still another example of display in accordance with the embodiment of the language-information providing apparatus of the present invention.

This description is for a case where the day and time or the year, month, and day are set as information on numerical values, a word or phrase, such as an adverb, for modifying such timewise elements can be added to an original phrase, so as to prepare a new sentence. FIG. 21 shows the flow of a change in the display screen in that case.

That is, in this example, instead of the data on the day and time or the year, month, and day, timewise modifying words and phrases, e.g., "today," "yesterday," "the day before yesterday," "later," "soon," and so on, are stored in a predetermined memory area of the ROM 9 as a list of modifying words and phrases.

As shown in a screen B10, after pressing a predetermined scene in FIG. 21, the clock mark M, indicating that the phrase being displayed is an addition-permitting sentence, is provided in the case of this example as well. In the same was as described before, if the replace/add key is pressed in this state, the screen changes to a screen B11 in which the clock mark M flashes, thereby informing the user of the fact that addition is possible.

In the screen B11, in which the addition-permitting mark M flashes, if, for example, the set key 41 is pressed after pressing the word key 31, the screen changes to one in which words and phrases expressing timewise information are consecutively displayed, as shown in a screen B12 in FIG. 21. In this case, if the up key Kup or the down key Kdw is pressed, the position of the arrow changes, and if pressed further, the screen changes to a screen B13 in a state in which words and phrases are scrolled one at a time. Namely, one word or phrase at a time is read out from the ROM 9, and two words or phrases are respectively displayed on the screen.

In the screen B13, if the set key 42 is pressed in the state in which the arrow is located at either word or phrase, the word or phrase is selected and the screen changes to a screen B14 (or B15) in which the selected word or phrase is added, in the case of Japanese, in front of the phrase which was being displayed in the screen B10, or in the case of English, after the phrase. Then, when the Japanese/English key 42 is pressed, if the display language was Japanese, a sentence translated into English is displayed, and if the display language was English, a sentence translated into Japanese is displayed.

In the above-described example, information on the "day" and "time" or information on the "year," "month," and "day" or words or phrases modifying timewise elements are added to phrases which, by themselves, are independent sentences, so as to display the added sentences or output them as voice. Additionally, it is also possible to prepare added sentences such as those described below.

Usually, in the case of Japanese, a request sentence is formed by adding ". . . o onegai shimasu (, please)" after a word. Likewise, in the case of English, a similar request sentence is formed by adding ", please" after a word.

As shown in FIG. 3, in the case of this example, these requesting words or phrases of a modifying section, such as ". . . o onegai shimasu" and ", please," are stored in a requesting modifying word address in the ROM 9.

In addition, although a description has not been given as the contents of the memory in the ROM 9 shown in FIG. 3, in the case of this example, words such as "album," "whisky," "beer," and "apple" are stored in such a manner that these words can be retrieved by using one initial character thereof as a keyword. Then, if the work key 31 is pressed, in the case of Japanese, a word can be retrieved by means of a cursor key by using one character of "a, i, u, e, o" as a respective keyword. In the case of English, a word can be retrieved by using one letter of the alphabet as a keyword.

Since, in the case of Japanese, words arranged in order of the Japanese syllabary are stored in the word memory area of the ROM 9, retrieval can be effected by consecutively scrolling the word memory area. If the position of a predetermined hiragana is selected as a key, retrieval can be effected starting with that key character. The same applies to English words.

If the request key 32 is pressed, of the words that can be retrieved by the word key 31, only those words that can be used for request sentences can be read out from the ROM 9. For this reason, a memory area for requesting words is separately provided in the ROM 9.

Figure 22:
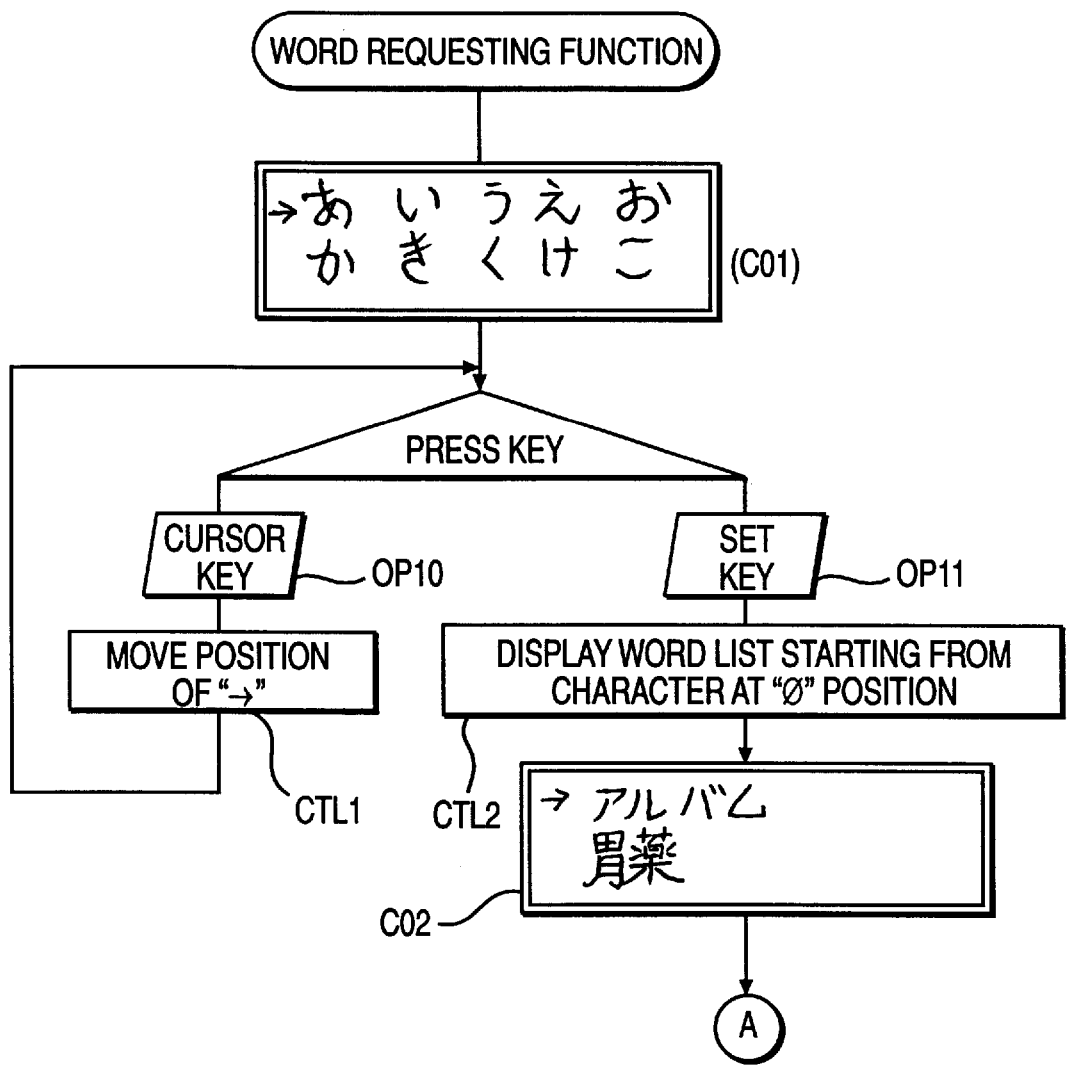
FIG. 22 is a portion of a flowchart for illustrating another example of operation in accordance with the embodiment of the language-information providing apparatus of the present invention.
Figure 23:
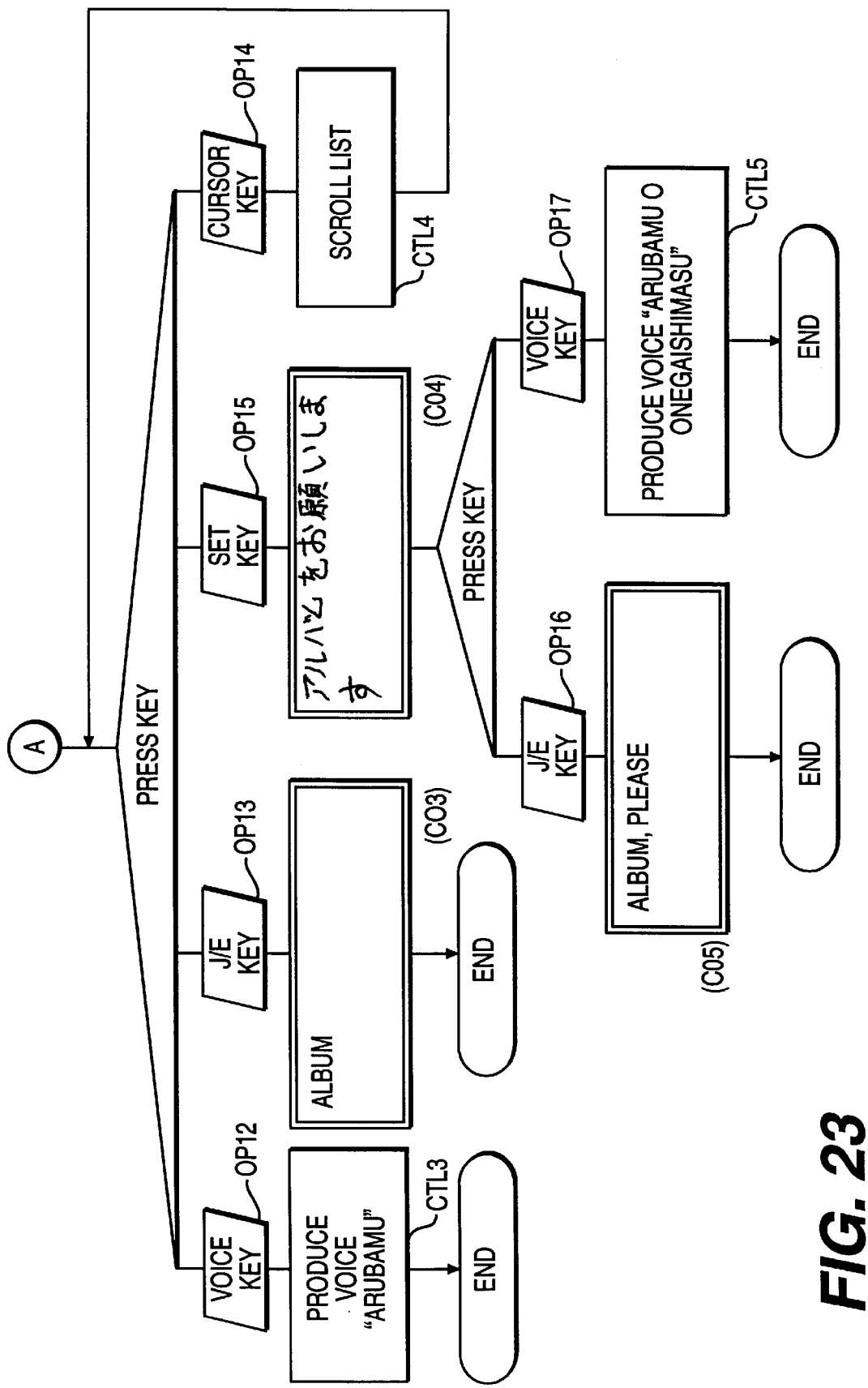
FIG. 23 is a continuation of the flowchart for illustrating the other example of operation in accordance with the embodiment: of the language-information providing apparatus of the present invention.
Figure 24:
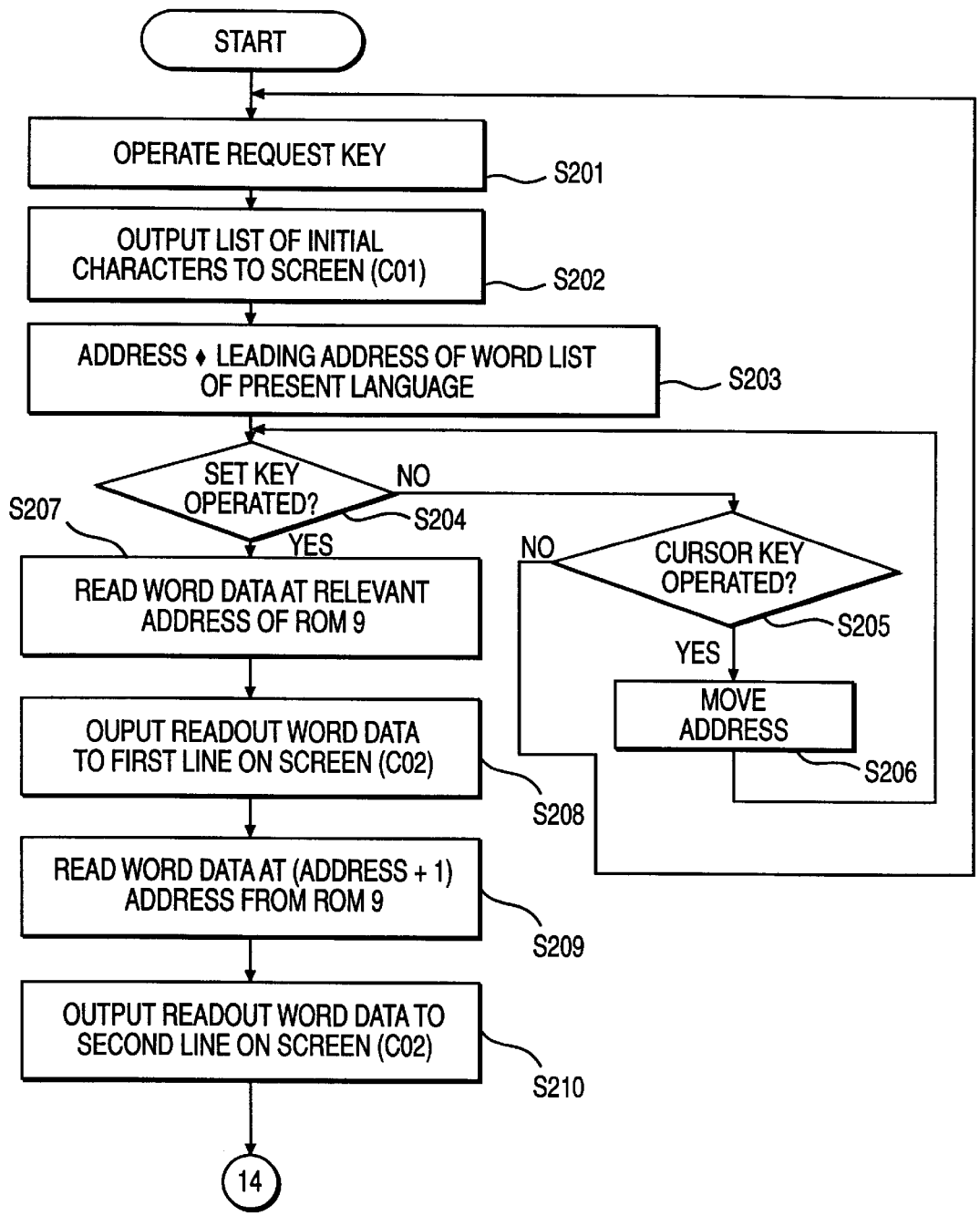
FIG. 24 is a diagram illustrating a portion of a flowchart of the processing operation in a further example of operation in accordance with the embodiment of the language-information providing apparatus of the present invention.
Figure 25:
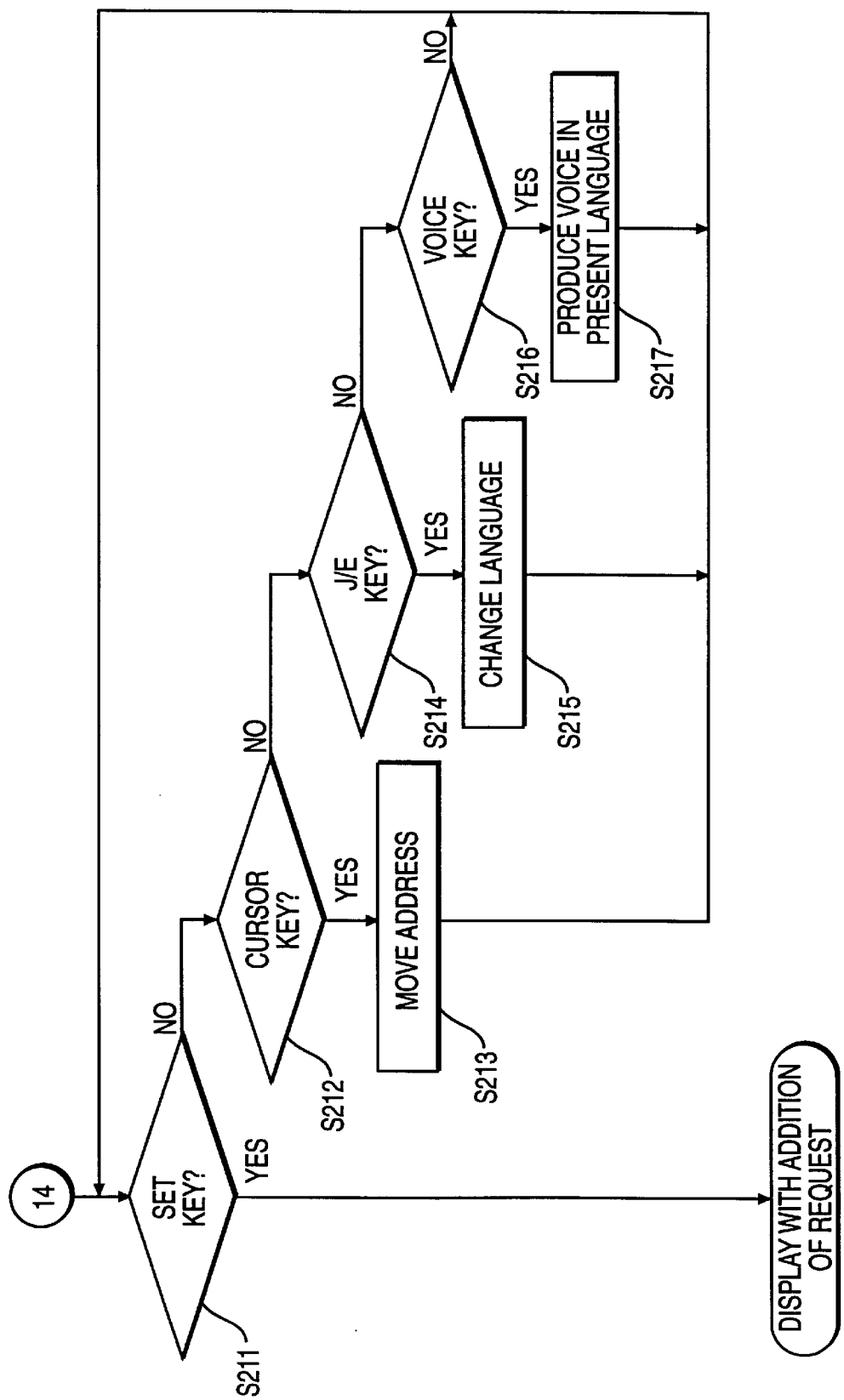
FIG. 25 is a diagram illustrating a continuation of a flowchart of the processing operation in the further example of operation in accordance with the embodiment of the language-information providing apparatus of the present invention.

Hereafter, a description will be given of processing for forming a request sentence by adding a requesting modifying word to the word. FIGS. 22 and 23 are diagrams illustrating the flow in which the user's operations, such as displaying during processing for forming the request sentence, are combined. In addition, FIGS. 24 and 25 are flowcharts of processing by the ROM 2 for processing for forming the request sentence.

First, referring to FIGS. 22 and 23, a description will be given of the user's operation and the flow of change in the display screen. In FIGS. 22 and 23, portions surrounded by a double frame indicate the state of the display screen of the display 7. The routine of a word requesting function shown in FIG. 22 is entered by pressing the request key 32 shown in FIG. 2.

That is, if the request key 32 is pressed, in FIG. 22, a screen C01 displaying a list of initial characters appears on the display 7. The example of FIG. 22 is a list screen in the case of Japanese, and the arrow points to the position of the initial character being selected as a keyword. If one of the cursor keys KS is operated in the state of this screen (operation OP10), the position of the arrow moves (control operation CTL1). The position of this arrow corresponds to a leading address of words which begin with the initial character serving as the keyword.

After the arrow is moved to the position of the initial character of the word to be displayed, the user presses the set key 42 (operation OP11). Then, words are consecutively read out from the ROM 9 starting with the address of the position of the arrow in the list of requesting words, and are displayed as a screen C02 (control operation CTL2). In this example, two words are displayed at a time.

In the state shown in FIG. 22, as an initial character, "a" has been selected as a keyword, and two words, "arubamu (album)" and "igusuri (medicine for the stomach)," are displayed on the screen of the display 7. In the screen C02, the arrow indicates the position of the word being presently selected. This indicates the address of the relevant word in the list of requesting words in the ROM 9.

If the voice key 45 is pressed in the state of this screen C02 (operation OP12), the selected word, i.e., "arubamu," is produced as voice (control operation CTL3). In addition, if the Japanese/English key 43 is pressed (operation OP13), the screen changes to a screen C03 in which "Album" translated from the Japanese "arubamu" into English is displayed.

Further, if the cursor key KS is operated in the screen C02 (operation OP14), the word list is scrolled starting from the portion of the requesting word being displayed (control operation CTL4). Then, if the user finds a word to be selected as a result of scrolling, the user presses the set key in the screen C02 (operation OP15). Then, the screen changes to a screen C04 in which the requesting modifying word or phrase is displayed after the word indicated by the arrow. Namely, in the case of this example, "o onegai shimasu" is displayed after the word "arubamu," thereby displaying a request-added sentence "arubamu o onegai shimasu (Album, please.)."

Further, if the user presses the Japanese/English key 43 in this screen C04 (operation OP16), the screen changes to a screen C05 on which its English translation Album, please." is displayed. Meanwhile, if the voice key 45 is pressed in the screen C04 (operation OP17), "arubamu o onegai shimasu" is produced from the speaker 13 as voice (control operation CTL5). Also, although an illustration is not given in FIG. 23, if the voice key 45 is pressed in the screen COS, "Album, please." is produced from the speaker as voice.

Figure 26:
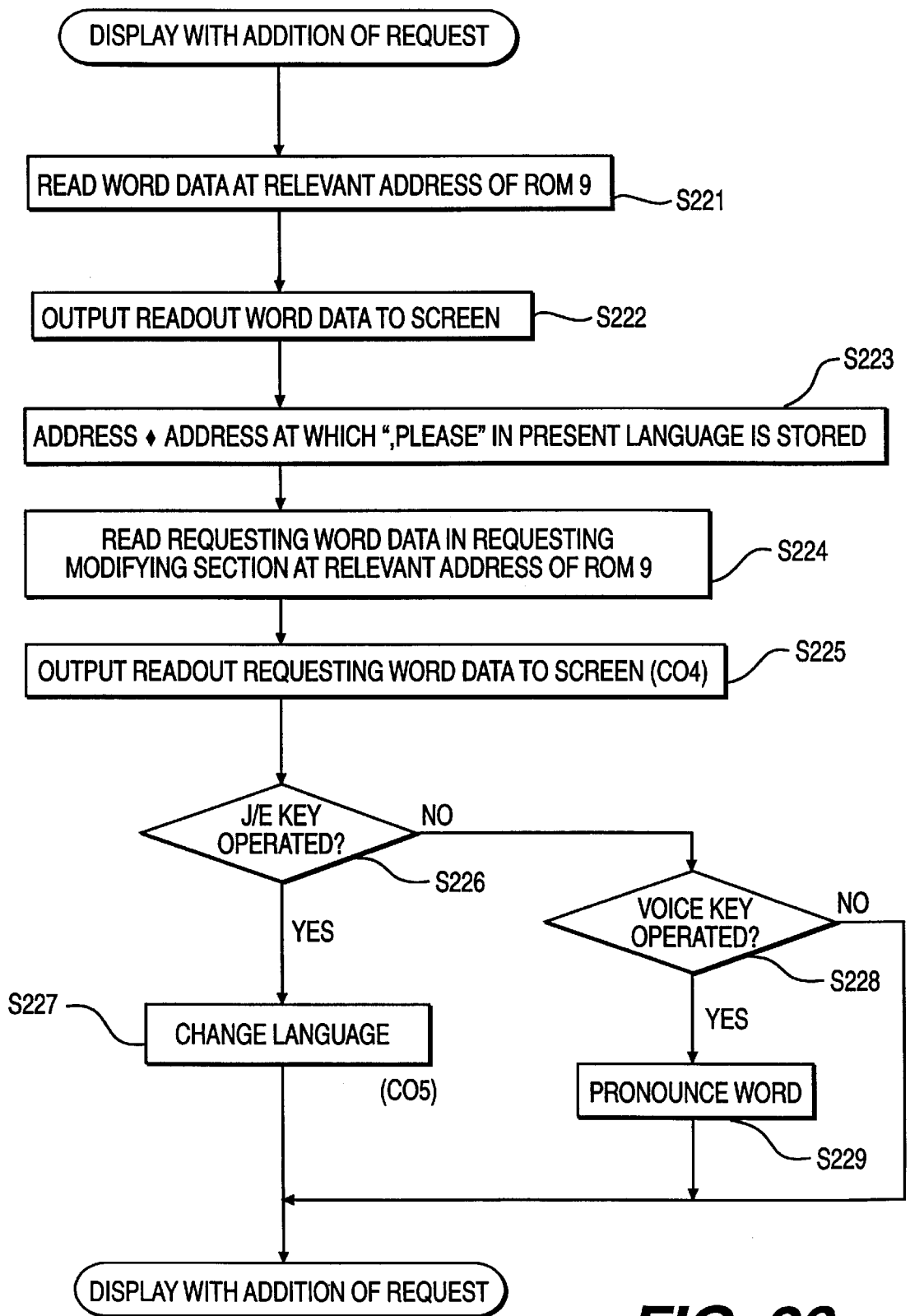
FIG. 26 is a diagram illustrating a continuation of a flowchart of the processing operation in the further example of operation in accordance with the embodiment of the language-information providing apparatus of the present invention.

Referring now to FIGS. 24 to 26, a description will be given of flowcharts of practical processing of the above-described word requesting function.

First, if the request key 32 is pressed in Step S201, the screen C01 of a list of initial characters appears on the display, as described above (Step S202). Then, as the read address in the ROM 9, a leading address of words beginning with the keyword where the arrow is located is designated in the requesting-word memory area (Step S203).

Subsequently, if not the set key 42, but any one of the cursor keys KS is pressed (Step S205), the position of the arrow consecutively moves with respect to the initial characters, and the read address in the ROM 9 correspondingly moves to the leading address of words beginning with the initial character at the position of the arrow (Step S206). Unless the set key 42 and the cursor key KS are pressed for a predetermined time or longer, the operation returns to the state prior to the routine of the word requesting function.

On the other hand, if the set key 42 is pressed in the screen C01 (Step S204), the data on the initial word among the words beginning with the initial character where the arrow is located is read out from the ROM 9 (Step S207). Then, that word is displayed on the first line of the screen, as shown in the screen C02 (Step S208).

Next, the read address in the ROM 9 (relevant address +1) is designated as the address, and ensuing word data is read out from the ROM 9 (Step S209). Then, the word thus read out is displayed on the second line of the screen, as shown in the screen C02 (Step S210). Next, if set key 42 is pressed in this state (Step S211), the operation proceeds to a next routine for displaying with the addition of a request.

On the other hand, if not the set key 42 but any one of the cursor keys KS is pressed (Step S212), the position of the arrow on the screen C02 moves as shown in FIG. 22, and the position of the read address in the ROM 9 correspondingly moves (Step S213).

If neither the set key 42 nor the cursor key KS, but the Japanese/English key 43 is pressed (Step S214), the screen is changed over to a screen in which the language being presently displayed on the display 7 is translated into the other language, e.g., the screen C03 (Step S215).

Further, if neither the set key 42, the cursor keys KS, nor the Japanese/English key 43 is pressed but the voice key 45 is pressed (Step S216), the word in the language being presently displayed is pronounced (Step S217). Subsequently, the operation waits for the set key 42 to be pressed, and if the set key 42 is pressed, the operation proceeds to the routine of displaying with the addition of a request, as described above.

Next, a description will be given of the routine for displaying with the addition of a request which is shown in FIG. 26.

First, when the set key 42 is pressed, the word where the arrow is located is read out in the screen C02 or C03 (Step S221). Then, the word data thus read out is outputted to the screen (Step S222).

Subsequently, the address for the requesting modifying word or phrase, i.e., if the language being presently displayed is Japanese, "o onegai shimasu," and, if English, ", please," is designated as the read address in the ROM 9 (Step S223). The data on the word or phrase at that address is then read out from the ROM 9 (Step S224). Then, the data on the requesting word thus read out is outputted to the screen of the display 7 to be added after the word (Step S225). This screen becomes the screen C04 or C05 in FIG. 23. Since the language being displayed is Japanese in the case of this example, the screen C04 is displayed.

Next, the operation proceeds to Step S226 to determine whether the Japanese/English key 43 has been pressed. If it is determined that the key has been pressed, translation is carried out, and an English display is given as in the scene C05 (Step S227). It goes without saying that if English was being displayed on the screen of the display 7 in Step S225, the English would be translated into Japanese in Step S227.

Subsequent to Step S227, the display with the addition of a request is continued.

On the other hand, if it is determined in Step S226 that the entry by the Japanese/English key 43 has not been made and the voice key 45 has been pressed (Step S228), the voice of the relevant request sentence is produced (Step S229). If a key entry by neither the Japanese/English key 43 nor the voice key 45 is made, the display with the addition of a request is continued in that state.

By adding a requesting word or phrase after a word in the above-described manner, it is possible to form a request sentence.

In the case of the formation of the request sentence, since, in this example, only the words capable of forming a request sentence are read out from the ROM 9 by pressing the request key 32, the addition-permitting mark need not be displayed on the screen of the display 7, unlike the case of the addition-permitting phrase.

However, an arrangement may be provided such that, without providing an area for words capable of making requests, the words capable of making requests are stored jointly in the word memory area, and only the word key 31 is provided without providing the request key 32. In this case, identification data for indicating that the word is capable of making a request is attached in front of each word.

Then, when a word is displayed on the display 7 by retrieving by the word key 31, if the word being displayed is a word capable of making a request, a display mark indicating to that effect is displayed. Then, when the replace/add key 41 is pressed in the state in which the word with the display mark attached thereto has been selected, the display mark flashes, thereby informing the user that the mode has been set in a mode in which the requesting modifying word or phrase can be added. If the set key 42 is pressed in this state, the requesting modifying word or phrase is added after the selected word in this above-described manner, thereby forming a request sentence.

In such a case, it is unnecessary to provide the request key 32 separately, and it is unnecessary to provide the memory area for words capable of making requests. Hence, the amount of data stored in the ROM 9 can be reduced by that margin, so that the ROM 9 can be provided with a small capacity. Although, in the above-described example, the ROM 9 is constituted by one ROM, it goes without saying that the ROM 9 may be constituted by a plurality of ROMs.

In addition, although, in the above-described example, one kind of mark is used as the mark indicating that a word is capable of being added, in order to distinguish among a mode for adding information on the year, month, and day to a phrase, a mode for adding data on the day and time, and a mode for adding a timewise modifying word or phrase, the addition-permitting discriminating mark which is displayed in front of the phrase may be changed among the modes. As a result, the user is capable of ascertaining the mode as to which information is to be added.

For example, for a mode in which, in an initial screen, the clock mark M is displayed as the mark indicating that the information on the "day" and "time" can be added, and the "year," "month," and "day" are added by subsequently pressing a predetermined key, a figure of, for instance, a calendar can be displayed on the screen as a mark displaying that such information can be added. If the mode is set to one for adding a timewise modifying word or phrase by additionally depressing a predetermined key, another mark different from these marks is displayed.

It should be noted that a sentence is divided into words or phrases, and an adding sentence may be inserted midway thereof. In this case, only words and phrases of a pattern in which an adding sentence is inserted midway in the sentence are collected in advance as one group, and, in the case of that group, dividing positions are shown in the respective phrases, to consecutively add an additional sentence at the respective dividing positions, in the same way as described above.

Although, in the above-described example, the user is informed of the fact that addition is possible, by attaching the display mark indicating to that effect on the screen of the display 7 with respect to a sentence, word, or phrase permitting addition, the user may be informed not by the display mark but by the flashing of the sentence, word, or phrase itself, or flashing part of the sentence, word, or phrase, e.g., only the initial character. Additionally, sound may, of course, be used to inform the user of the fact that the sentence, word, or phrase is capable of addition.

The above example is a case where the languages are Japanese and English, and it goes without saying that the present invention is applicable to other languages as well.

As described above, in accordance with the present invention, since a portion of a particular word or phrase in a sentence is not replaced, and another word, phrase, or sentence is added to a sentence, word, or phrase, the sentence which is read out from a storage means can be outputted as it is without performing addition. Then, it is possible to add a word or phrase designated by the intention of the user with respect to a sentence which is valid as an independent sentence.

Then, in a case where information on the day and time or information on the year, month, and day is added, it suffices if data on the year, month, day, hour, and minute, such as individual year data, month data, day data, hour data, and minute data, are stored in the memory. Therefore, it is unnecessary to prepare in advance patterns of all the combinations of data on the year, month, day, hour, and minute for replacement as in the conventional example of a replacement system described at the beginning, so that the memory capacity can be made small.

In addition, in the present invention, in a case where addition is possible with respect to an outputted sentence, word, or phrase, the user is informed to that effect by an informing means, so that the user is readily capable of moving to an adding operation by virtue of this signaling, thereby facilitating the ease of use.

In addition, in the present invention, since a setting can be provided such that a word, phrase, or sentence to be added is added to a particular position depending on a subject language, algorithms can be simplified and the capacity of the memory can be reduced. In other words, it suffices if information on the day and time or the year, month, and day is systematically added at the end of the sentence if the subject language is, for instance, English, or at the beginning of the sentence if it is Japanese.

Furthermore, in the case of a request sentence, if the subject languages are, for instance, English and Japanese, it suffices if the requesting word is added to the end of the sentence in both cases, so that algorithms can be simplified.

What is claimed is:

1. A language-information providing apparatus for producing syntactically complete syntactic structures, and words or phrases that can be used in a syntactically complete sentence, in a selected language, said apparatus comprising:

storing means for storing a plurality of the complete syntactic structures near stored information about additions that are permitted to be added to the stored syntactic structures to form structures;

syntactically complete output means for outputting a selected one of the stored syntactic structures from said storing means;

signaling means for indicating the storage of the additional information for the selected syntactic structure;

input means for receiving additions to the selected syntactic structure according to stored additional information; and modifying means for adding the received additions according to the additional information to the selected syntactic structure in accordance with grammatical rules of the selected language.

2. The language-information providing apparatus of claim 1 wherein the output means includes a CPU and a speaker.

3. The language-information providing apparatus of claim 2 wherein the signaling means includes an indicator appearing on the display device.

4. The language-information providing apparatus of claim 1 wherein the output means includes a CPU and a speaker.

5. The language-information providing apparatus of claim 1 wherein the input means includes keys.

6. The language-information providing apparatus of claim 1 wherein the modifying means includes a CPU.

7. A language-information providing apparatus for producing syntactically complete syntactic structures, including syntactically complete sentences, and words or phrases that can be used in a syntactically complete sentence, in a selected language, said apparatus comprising:

storing means for storing a plurality of the syntactic structures that are complete without addition or modification and that permit time-related additions or modifications to the syntactic structures;

output means for outputting a selected one of the stored syntactic structures from said storing means;

input means for inputting temporal information as a time-related addition or modification for the selected one syntactic structure; and modifying means for modifying the selected one syntactic structure in accordance with the input temporal information and in accordance with grammatical rules of the selected language.

8. The language-information providing apparatus of claim 7 wherein the output means includes a display device.

9. The language-information providing apparatus of claim 7 wherein the output means includes a speaker.

10. The language-information providing apparatus of claim 7 wherein the input means includes keys.

11. The language-information providing apparatus of claim 7 wherein the modifying means includes a CPU.

12. A language-information providing apparatus for producing a plurality of syntactically complete syntactic structures, including syntactically complete sentences, and words or phrases that can be used in a syntactically complete sentence, in a predetermined language, said apparatus comprising:

storing means for storing a plurality of the syntactically complete syntactic structures along with signals that permit additions or modifications to the syntactic structures to produce respective syntactically complete syntactic structures;

output means for outputting a selected one of the stored syntactic structures from said storing means;

input means for receiving additional information for modifying the selected one syntactic structure; and modifying means for adding a stored syntactic structure to the selected one syntactic structure in accordance with the additional information and in accordance with grammatical rules of the selected language.

13. The language-information providing apparatus of claim 12, wherein the output means includes a display device.

14. The language-information providing apparatus of claim 12 wherein the output means includes a speaker.

15. The language-information providing apparatus of claim 12 wherein the input means includes keys.

16. The language-information providing apparatus of claim 12 wherein the modifying means includes a CPU.

17. A language-information providing apparatus for translating syntactically complete syntactic structures, including syntactically complete sentences, and words or phrases that can be used in a syntactically complete words or phrases into a selected language, said apparatus comprising:
   storing means for storing a plurality of the syntactically complete sentences as well as the words and phrases, along with information about the syntactic structures in a first language;
   output means for outputting a noun or a noun clause based on the information about syntactic structures in the first language;
   modifying means for adding a modifying word or phrase to the noun or noun clause to produce a modified syntactic structure in the first language;
   control means for causing the output means to output the modified syntactic structure in the first language;
   translation-instruction means for receiving an indication to translate the modified syntactic structure from the first language to the selected language; and
   translating means for translating the modified syntactic structure from the first language into the selected language.

18. The language-information providing apparatus of claim 17 wherein the output means includes a display device.

19. The language-information providing apparatus 17 wherein the output means includes a speaker.

20. The language-information providing apparatus of claim 17 wherein the modifying means includes a CPU.

21. The language-information providing apparatus of claim 17 wherein the control means includes a CPU.

22. The language-information providing apparatus of claim 17 wherein the translation-instruction means includes a CPU.

23. The language-information providing apparatus of claim 17 wherein the translating means includes a CPU.

24. A language-information providing apparatus for producing syntactically complete syntactic structures, including syntactically complete sentences without addition or modification, and words or phrases that can be used in a syntactically complete sentence, in a selected language, said apparatus comprising:
   storing means for storing a plurality of the syntactically complete sentences and the words and phrases as addition syntactic structures;
   input means for inputting an addition syntactic structure and for inputting a sentence as a syntactically complete subject syntactic structure from the storing means;
   modifying means for adding the addition syntactic structures to the subject syntactic structure at a relative position depending on the selected language to produce a syntactic structure that is also syntactically complete; and
   output means for outputting the produced syntactic structure resulting from adding the addition syntactic structure to the subject syntactic structure.

25. The language-information providing apparatus of claim 24 wherein input means includes keys.

26. The language-information providing apparatus of claim 24 wherein the modifying means includes a CPU.

27. The language-information providing apparatus of claim 24 wherein the output means includes a display device.

28. The language-information providing apparatus of claim 24 wherein the output means includes a speaker.

29. A language-information providing apparatus comprising:
   first storing means for storing a plurality of sentence data, each sentence data including addition-possibility data indicating whether a word or phrase can be added to a syntactically complete sentence corresponding to that sentence data;
   second storing means for storing words and phrases usable without modification in syntactically complete sentences corresponding to the sentence data stored in the first storing means;
   first selecting means for selecting one of the sentence data stored in said first storing means;
   second selecting means for selecting one of the words and phrases stored in said second storing means;
   display means for displaying the selected sentence data and the selected word or phrase; and
   sentence input means for allowing selection by said second selecting means when the addition-possibility data of the selected sentence data indicates that a word or phrase can be added to the syntactically complete sentence corresponding to the selected sentence data, to produce a modified syntactically complete sentence.

30. The language-information providing apparatus of claim 29 wherein the first and second selecting means include input keys.

31. The language-information providing apparatus of claim 29 wherein the display means includes a display device.

32. The language-information providing apparatus of claim 29 wherein the sentence input means includes a CPU.

33. A translating apparatus for translating a sentence in a first language into a sentence in a second language, said apparatus comprising:
   first storing means for storing a plurality of sentence data in the first language, each of the sentence data including addition-possibility data indicating whether a word or phrase that can be used without modification in a syntactically complete sentence can be added to at least one syntactically complete sentence corresponding to the sentence data;
   second storing means for storing words and phrases that may be added to sentences corresponding to the plurality of sentence data stored in said first storing means;
   first selecting means for selecting one of the sentence data stored in said first storing means;
   second selecting means for selecting one of the words and phrases stored in said second storing means;
   display means for displaying the selected sentence data and the selected word or phrase;
   sentence input means for allowing selection by said second selecting means when the addition-possibility data of the selected sentence data indicates that a stored word or phrase can be added to the syntactically complete sentence corresponding to the selected sentence data to produce a modified, syntactically complete sentence; and
   translating means for translating the modified, syntactically complete sentence from the first language into the second language.

34. The language-information providing apparatus of claim 33 wherein the first and second selecting means include input keys.

35. The language-information providing apparatus of claim 33 wherein the display means includes a display.

36. The language-information providing apparatus of claim 33 wherein the sentence input means includes a CPU.

37. The language-information providing apparatus of claim 33 wherein the translating means includes a CPU.

38. A method for producing syntactically complete syntactic structures, including syntactically complete sentences, and words or phrases that can be used in a syntactically complete sentence without addition or modification to the words or phrases, in a selected language, comprising the steps of:

storing a plurality of the syntactically complete syntactic structures near stored information about additions that are permitted to be added to the stored syntactic structures to form syntactic structures that are syntactically complete after addition;

outputting a selected one of the stored syntactic structures;

indicating the storage of the additional information near the selected syntactic structure;

receiving additions to the selected syntactic structure according to the stored additional information; and adding the received additions according to the additional information to the selected syntactic structure in accordance with grammatical rules of the selected language.

39. The method of claim 38 further including the step of outputting the selected syntactic structure with the received additions according to the additional information.

40. A method for producing a plurality of syntactically complete syntactic structures, including sentences that are syntactically complete without addition or modification, and words or phrases that can be used in a syntactically complete sentence, in a selected language, comprising the steps of:

storing a plurality of the syntactically complete syntactic structures that permit time-related additions or modifications to the syntactic structures to produce respective syntactically complete syntactic structures;

outputting a selected one of the stored syntactic structures;

inputting temporal information as a time-related addition or modification for the selected one syntactic structure; and adding the temporal information to the selected one syntactic structure in accordance with grammatical rules of the selected language.

41. The method of claim 40, further including the step of outputting the selected syntactic structure with the temporal information.

42. The method claim 41, further including the step of outputting the modified, syntactically complete syntactic structure as the selected one of syntactic structures with the additional information.

43. A method for producing syntactically complete syntactic structures, including syntactically complete sentences, and words or phrases that can be used in a syntactically complete sentence, in a selected language, comprising the steps of:

storing a plurality of items of information about syntactically complete syntactic structures, including storing sentences that are syntactically complete without addition or modification, and words or phrases that can be used in a syntactically complete sentence without addition or modification to the words or phrases;

outputting a selected one of the stored items of information corresponding to a selected one of the syntactic structures;

receiving additional information for modifying the selected one of the syntactic structures; and adding the additional information to the selected item of information corresponding to the selected one of the syntactic structures in accordance with grammatical rules of the selected language to produce a modified, syntactically complete syntactic structure.

44. A method for translating syntactic structures including syntactically complete sentences, and words or phrases that can be used in a syntactically complete sentence modification to the words or phrases into a selected language, comprising the steps of:

storing means for storing a plurality of the syntactically complete sentences as well as the words and phrases, and storing information about syntactic structures in a first language;

outputting a noun or a noun clause based on information about syntactic structures in a first language;

adding a modifying word or phrase to the noun or noun clause to produce modified syntactic structure in the first language;

causing the output means to output the modified syntactic structure in the first language;

receiving an indication to translate the modified syntactic structure from the first language into the selected language; and translating the modified syntactic structure from the first language into the selected language.

45. The method of claim 44, further including the step of outputting the translated, modified syntactic structure.

46. A method for producing syntactically complete syntactic structures including syntactically complete sentences, and words or phrases that can be used in a syntactically complete sentence in a selected language, said apparatus comprising:

storing means for storing a plurality of the syntactically complete sentences as well as the words and phrases, and storing information about syntactic structures in a first language;

inputting an addition syntactic structure;

adding the addition syntactic structure to a subject syntactically complete syntactic structure at a relative position depending on the selected language to produce a syntactically complete syntactic structure; and outputting the produced syntactic structure resulting from adding the addition syntactic structure to the subject syntactic structure.

47. A method for facilitating translation, comprising the steps of:

storing a plurality of sentence data each including addition-possibility data indicating whether a word or phrase that can be used without modification in a syntactically complete sentence can be added to at least one syntactically complete sentence corresponding to that sentence data;

storing words and phrases that may be added to sentences corresponding to the stored sentence data;

selecting one of the stored sentence data;

selecting one of the stored words and phrases;

displaying the selected sentence data and the selected word or phrase; and allowing selection when the addition-possibility data of the selected sentence data indicates that a stored word or phrase can be added to the at least one syntactically complete sentence corresponding to the selected sentence data to produce a modified syntactically complete sentence.

48. A method for translating a sentence in a first language into a sentence in a second language, comprising the steps of:

storing a plurality of sentence data in the first language, each of the sentence data including addition-possibility data indicating whether a word or phrase that can be used without modification in a syntactically complete sentence can be added to at least one syntactically complete sentence corresponding to the sentence data;

storing words and phrases that may be added to sentences corresponding to the plurality of stored sentence data;

selecting one of the stored sentence data;

selecting one of the stored words and phrases;

displaying the selected sentence data and the selected word or phrase;

allowing selection by said second selecting means when the addition-possibility data of the selected sentence data indicates that a word or phrase can be added to the at least one syntactically complete sentence corresponding to the selected sentence data to produce a modified syntactically complete sentence; and translating the modified syntactically complete sentence from the first language into the second language.

49. The method of claim 48, further including the step of outputting the translated modified syntactically complete sentence in the second language.

* * * * *

UNITED STATES PATENT AND TRADEMARK OFFICE
CERTIFICATE OF CORRECTION

PATENT NO.     : 5,868,576
DATED          : February 9, 1999
INVENTOR(S)    : Tomoe Maruta It is certified that error appears in the above-identified patent and that said Letters Patent is hereby corrected as shown below:

Column 26,
Line 6, "speaker" should read -- display device --.

Signed and Sealed this

Twenty-seventh Day of May, 2003

JAMES E. ROGAN
*Director of the United States Patent and Trademark Office*